US012591296B2

(12) United States Patent
Chatzikalymnios et al.

(10) Patent No.: US 12,591,296 B2
(45) Date of Patent: Mar. 31, 2026

(54) REDUCING POWER CONSUMPTION OF EXTENDED REALITY DEVICES

(71) Applicant: Snap Inc., Santa Monica, CA (US)

(72) Inventors: Evangelos Chatzikalymnios, Vienna (AT); Thomas Faeulhammer, Vienna (AT); Daniel Wolf, Mödling (AT); Kai Zhou, Wiener Neudorf (AT)

(73) Assignee: SNAP INC., Santa Monica, CA (US)

( * ) Notice: Subject to any disclaimer, the term of this patent is extended or adjusted under 35 U.S.C. 154(b) by 194 days.

(21) Appl. No.: 18/478,853

(22) Filed: Sep. 29, 2023

(65) Prior Publication Data

US 2025/0068228 A1     Feb. 27, 2025

(30) Foreign Application Priority Data

Aug. 24, 2023     (GR) ............................... 20230100690

(51) Int. Cl.
*G06F 1/3287*       (2019.01)
*G06V 40/10*       (2022.01)

(52) U.S. Cl.
CPC .......... *G06F 1/3287* (2013.01); *G06V 40/107* (2022.01)

(58) Field of Classification Search
CPC ............................ G06F 1/3287; G06V 40/107
See application file for complete search history.

(56) References Cited

U.S. PATENT DOCUMENTS

| | | | |
|---|---|---|---|
| 4,545,576 A | 10/1985 | Harris | |
| 11,381,743 B1 * | 7/2022 | Mahbub | ................. H04N 23/65 |
| 11,800,242 B2 * | 10/2023 | Holland | ............... H04N 23/951 |
| 2013/0238295 A1 | 9/2013 | Hyung et al. | |
| 2015/0062165 A1 | 3/2015 | Saito | |
| 2017/0123487 A1 | 5/2017 | Hazra et al. | |
| 2020/0084387 A1 * | 3/2020 | Baldwin | ............... H04N 23/45 |
| 2021/0133452 A1 | 5/2021 | Berkovich et al. | |
| 2021/0232232 A1 | 7/2021 | Wang et al. | |
| 2022/0198682 A1 | 6/2022 | Oh | |
| 2023/0214027 A1 | 7/2023 | Erivantcev et al. | |
| 2023/0260155 A1 | 8/2023 | Zhang et al. | |
| 2024/0169677 A1 | 5/2024 | Challapalli | |

FOREIGN PATENT DOCUMENTS

| | | |
|---|---|---|
| WO | 2022005708 | 1/2022 |
| WO | WO-2023044233 A1 | 3/2023 |

OTHER PUBLICATIONS

"U.S. Appl. No. 18/741,375, Non Final Office Action mailed Mar. 5, 2025", 13 pgs.

(Continued)

*Primary Examiner* — Tom Y Lu

(74) *Attorney, Agent, or Firm* — SCHWEGMAN LUNDBERG & WOESSNER, P.A.

(57)     ABSTRACT

Examples describe a method performed by an extended reality (XR) device that implements a multi-camera object tracking system. The XR device accesses object tracking data associated with an object in a real-world environment. Based on the object tracking data, the XR device activates a low-power mode of the multi-camera object tracking system. In the low-power mode, a state of the object in the real-world environment is determined by using the multi-camera object tracking system.

20 Claims, 15 Drawing Sheets

(56) References Cited

OTHER PUBLICATIONS

"International Application Serial No. PCT/US2024/043473, International Search Report mailed Nov. 25, 2024", 4 pgs.

"International Application Serial No. PCT/US2024/043473, Written Opinion mailed Nov. 25, 2024", 7 pgs.

Cordella, F., "A bio-inspired grasp optimization algorithm for an anthropomorphic robotic hand", International Journal on Interactive Design and Manufacturing, vol. 6, (Mar. 4, 2012), 113-122.

"U.S. Appl. No. 18/741,375, Examiner Interview Summary mailed Oct. 2, 2025", 2 pgs.

"U.S. Appl. No. 18/741,375, Notice of Allowance mailed Nov. 10, 2025", 8 pgs.

"U.S. Appl. No. 18/741,375, Response filed Oct. 8, 2025 to Non Final Office Action mailed Jul. 10, 2025", 10 pgs.

"U.S. Appl. No. 18/741,375, Non Final Office Action mailed Jul. 10, 2025", 15 pgs.

"U.S. Appl. No. 18/741,375, Response filed Jun. 3, 2025 to Non Final Office Action mailed Mar. 5, 2025", 8 pgs.

"International Application Serial No. PCT/US2025/033115, International Search Report mailed Aug. 21, 2025", 3 pgs.

"International Application Serial No. PCT/US2025/033115, Written Opinion mailed Aug. 21, 2025", 8 pgs.

\* cited by examiner

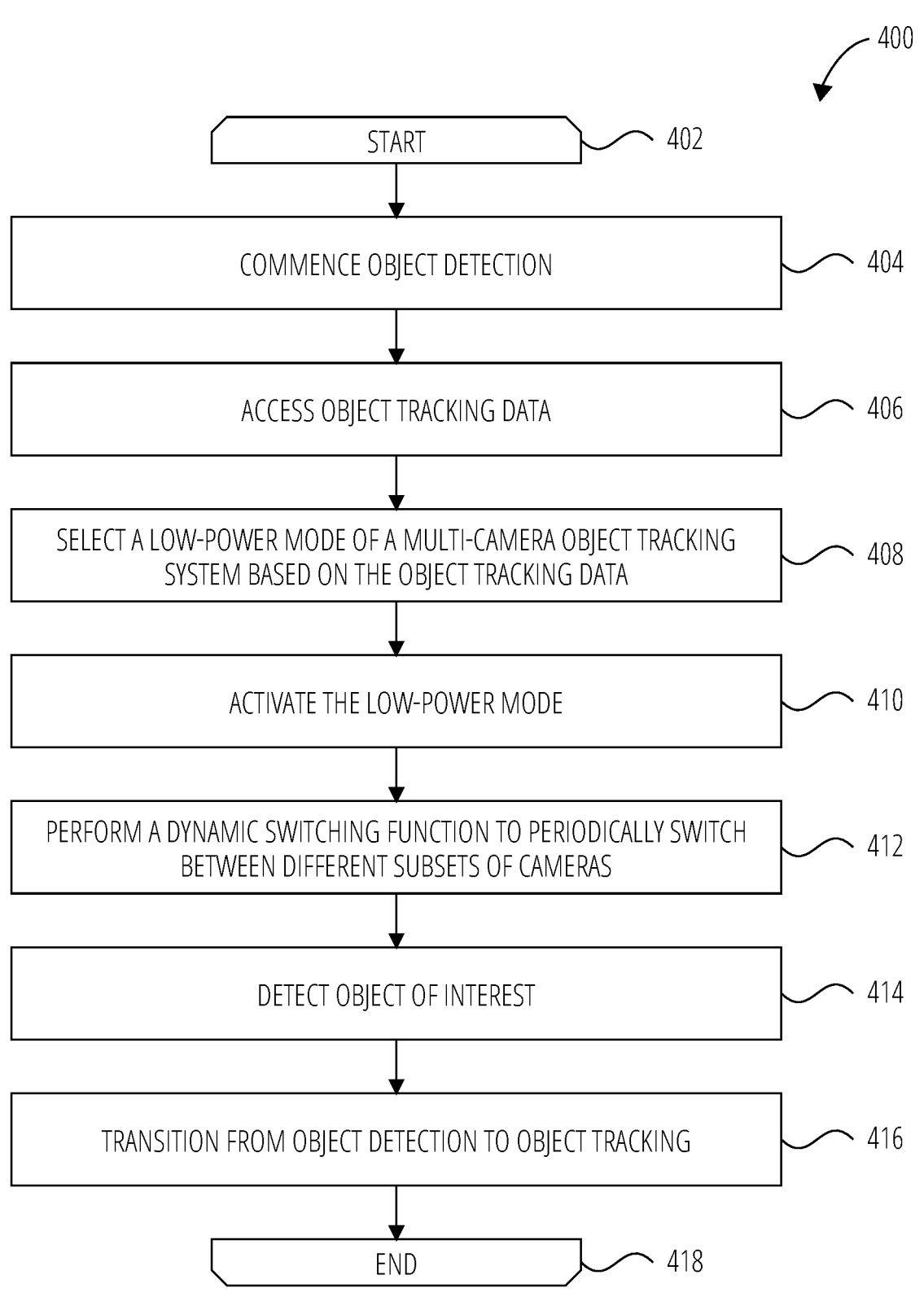

400

START — 402

COMMENCE OBJECT DETECTION — 404

ACCESS OBJECT TRACKING DATA — 406

SELECT A LOW-POWER MODE OF A MULTI-CAMERA OBJECT TRACKING SYSTEM BASED ON THE OBJECT TRACKING DATA — 408

ACTIVATE THE LOW-POWER MODE — 410

PERFORM A DYNAMIC SWITCHING FUNCTION TO PERIODICALLY SWITCH BETWEEN DIFFERENT SUBSETS OF CAMERAS — 412

DETECT OBJECT OF INTEREST — 414

TRANSITION FROM OBJECT DETECTION TO OBJECT TRACKING — 416

END — 418

FIG. 4

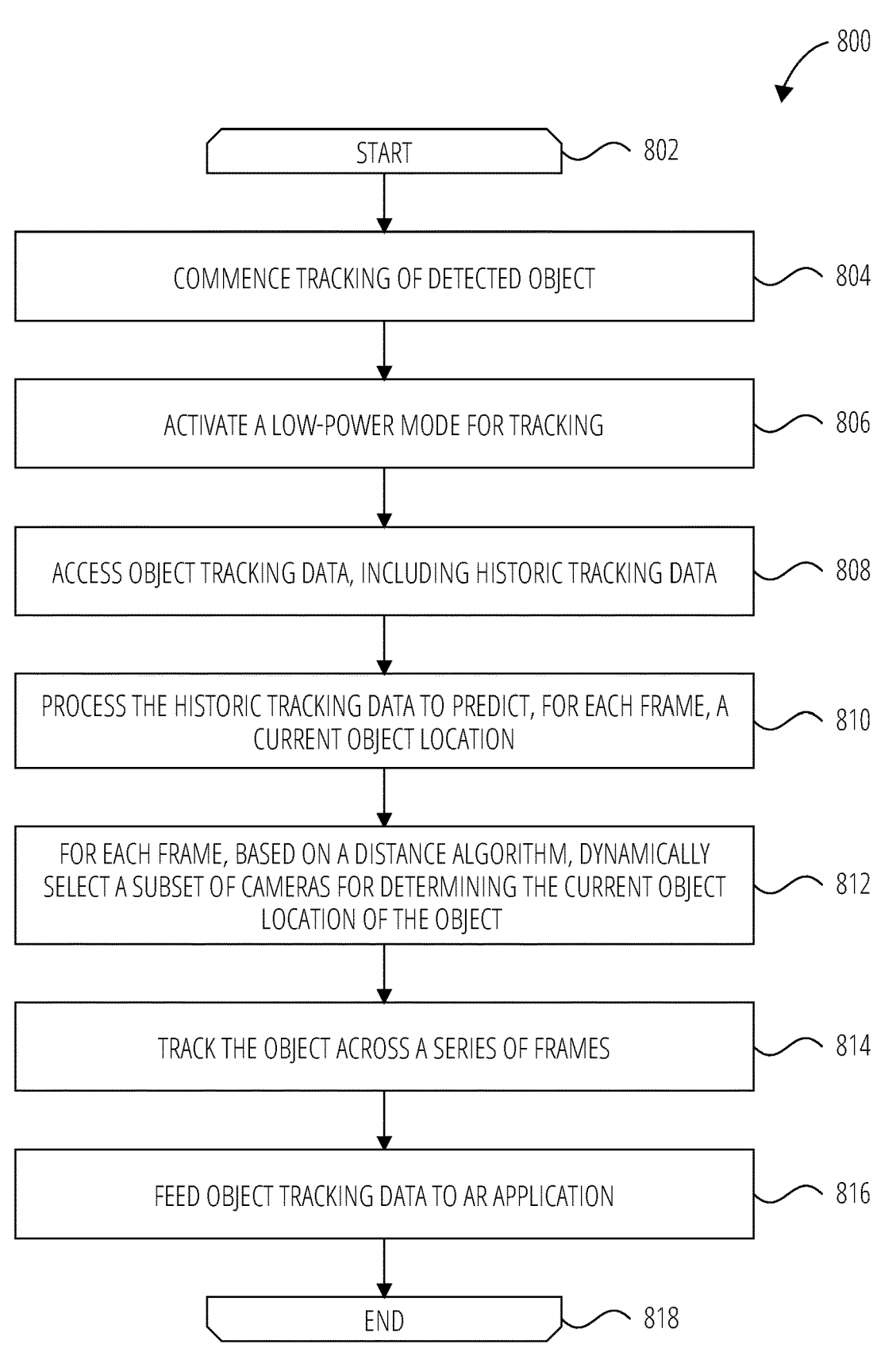

800

START — 802

COMMENCE TRACKING OF DETECTED OBJECT — 804

ACTIVATE A LOW-POWER MODE FOR TRACKING — 806

ACCESS OBJECT TRACKING DATA, INCLUDING HISTORIC TRACKING DATA — 808

PROCESS THE HISTORIC TRACKING DATA TO PREDICT, FOR EACH FRAME, A CURRENT OBJECT LOCATION — 810

FOR EACH FRAME, BASED ON A DISTANCE ALGORITHM, DYNAMICALLY SELECT A SUBSET OF CAMERAS FOR DETERMINING THE CURRENT OBJECT LOCATION OF THE OBJECT — 812

TRACK THE OBJECT ACROSS A SERIES OF FRAMES — 814

FEED OBJECT TRACKING DATA TO AR APPLICATION — 816

END — 818

FIG. 8

REDUCING POWER CONSUMPTION OF EXTENDED REALITY DEVICES

CLAIM OF PRIORITY

This application claims the benefit of priority to Greece Patent Application Ser. No. 20230100690, filed Aug. 24, 2023, which is incorporated herein by reference in its entirety.

TECHNICAL FIELD

The subject matter disclosed herein relates to extended reality (XR) devices. More specifically, the subject matter relates to techniques for reducing the power consumption of an XR device that implements a multi-camera object tracking system.

BACKGROUND

An XR device uses various sensors. Many XR devices include a multi-camera object tracking system that processes images captured by multiple cameras of the XR device to detect and track real-world objects.

While the use of more cameras can increase tracking performance, increasing the number of cameras used (or the sampling rate of the cameras) can significantly increase power consumption. XR devices, and particularly portable XR devices, often have limited computational resources and battery life. It may be technically beneficial to reduce the power consumption of an XR device without significantly degrading the performance of its multi-camera object tracking system.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which:

FIG. 4 is a flow diagram illustrating a method suitable for reducing power consumption of an XR device during an object detection phase, according to some examples.

FIG. 8 is a flow diagram illustrating a method suitable for reducing power consumption of an XR device during an object tracking phase, according to some examples.

DETAILED DESCRIPTION

Figure 1:
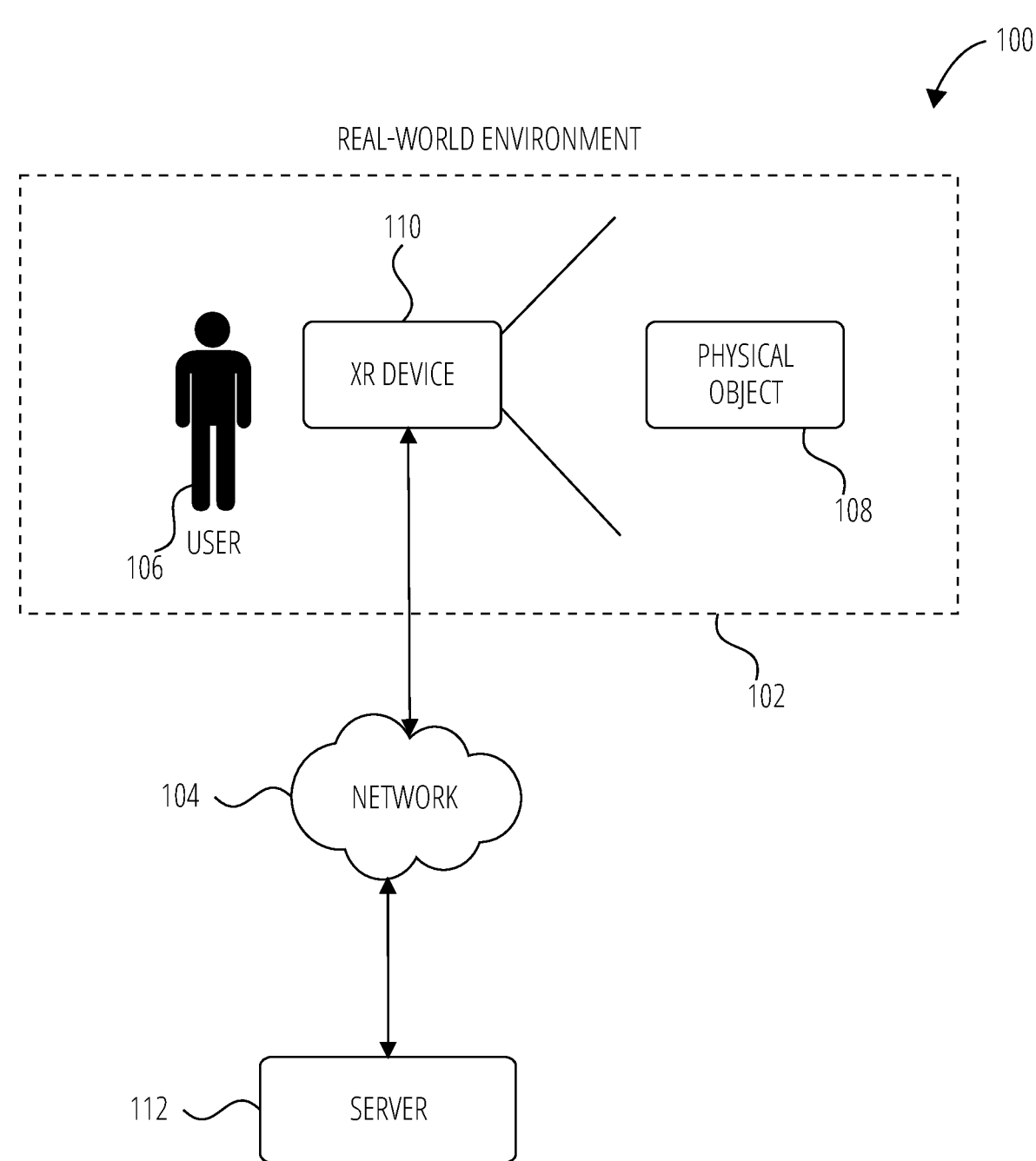
FIG. 1 is a block diagram illustrating a network environment for operating an XR device, according to some examples.

The description that follows describes systems, methods, devices, techniques, instruction sequences, or computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

The term "augmented reality (AR)" is used herein to refer to an interactive experience of a real-world environment where physical objects or environments that reside in the real world are "augmented" or enhanced by computer-generated digital content (also referred to as virtual content or synthetic content). An AR device can enable a user to observe a real-world scene while simultaneously seeing virtual content that may be aligned to objects, images, or environments in the field of view of the AR device. AR can also refer to a system that enables a combination of real and virtual worlds, real-time interaction, and 3D registration of virtual and real objects. A user of an AR system can perceive virtual content that appears to be attached or interact with a real-world physical object. The term "AR application" is used herein to refer to a computer-operated application that enables an AR experience.

The term "virtual reality (VR)" is used herein to refer to a simulation experience of a virtual world environment that is distinct from the real-world environment. Computer-generated digital content is displayed in the virtual world environment. A VR device can thus provide a more immersive experience than an AR device. The VR device may block out the field of view of the user with virtual content that is displayed based on a position and orientation of the VR device. VR also refers to a system that enables a user of a VR system to be completely immersed in the virtual world environment and to interact with virtual objects presented in the virtual world environment.

In general, AR and VR devices are referred to as XR devices, and related systems are referred to as XR systems. While examples described in the present disclosure focus primarily on XR devices that provide an AR experience, it will be appreciated that at least some aspects of the present disclosure may also be applied to other types of XR experiences, including certain VR experiences.

The term "user session" is used herein to refer to an operation of an application during periods of time. For example, a user session may refer to an operation of an AR application executing on a head-wearable XR device between the time the user puts on the XR device and the time the user takes off the head-wearable device. In some examples, the user session starts when the XR device is turned on or is woken up from sleep mode and stops when the XR device is turned off or placed in sleep mode. In other examples, the session starts when the user runs or starts an AR application, or runs or starts a particular feature of the AR application, and stops when the user ends the AR application or stops the particular features of the AR application.

The term "SLAM" (Simultaneous Localization and Mapping) is used herein to refer to a system used to understand and map a physical environment in real-time. It uses sensors such as cameras, depth sensors, and inertial measurement units (IMUs) to capture data about the environment and then uses that data to create a map of the surroundings of a device while simultaneously determining the device's location within that map. This allows, for example, an XR device to accurately place digital objects in the real world and track their position as a user moves and/or as objects move.

An XR device can receive a sequence of images and track one or more objects depicted in the images in a 3D space. The XR device may utilize various parameters to track an object. These parameters may include visual information (e.g., recognizing and tracking an object based on distinctive features), spatial information (e.g., using depth sensors and/or other spatial data to determine the location of the object), motion information (e.g., using a tracking system and/or computer vision algorithms to track motion and position over time), and predictive information (e.g., using a machine learning model to predict object motion).

Examples describe techniques performed by an XR device that implements a multi-camera object tracking system. The term "multi-camera object tracking system" is used herein to refer to any one or more applications, components, or systems that enable or facilitate detection or tracking visual features in images captured by the XR device. In examples described herein, the XR device includes multiple cameras, allowing for more accurate calculation of aspects such as depth and orientation of objects. However, in some cases, only a subset (e.g., one, two, or three) of the multiple cameras may be selected at a determinable point in time to reduce power consumption, balance power consumption and performance, or reduce processing requirements, as further described below.

A multi-camera object tracking system can identify and track the location, movement, or orientation of an object in 3D space, e.g., to enable the XR device to overlay virtual content onto the real world in an accurate or realistic manner. A multi-camera object tracking system may include, or communicate synergistically with, a SLAM system of the XR device, e.g., in the creation of a model of a real-world environment to improve object tracking performance. Processing components of the multi-camera object tracking system may be located device-side or server-side, or may have different components distributed across devices and/or servers.

By using a multi-camera object tracking system, the pose of an object can be estimated in a 3D space based on observations by multiple cameras over a period of time. Using multiple cameras has significant advantages, such as allowing for tracking from multiple angles, extending the overall field of view of the system, helping to overcome occlusions and providing more robust and reliable tracking results. However, capturing, processing, and merging image data from multiple cameras can be computationally intensive, requiring significant processing power and storage. Examples of the present disclosure are aimed at reducing the power consumption associated with a multi-camera object tracking system of an XR device.

In some examples, an XR device accesses object tracking data associated with an object in a real-world environment. Based on the object tracking data, the XR device activates a low-power mode of the multi-camera object tracking system. In the low-power mode, a state of the object is determined by using the multi-camera object tracking system.

The object may be a hand of a user of the XR device. In some examples, the low-power mode is activated to detect or track the hand of the user. The object tracking data may include handedness data identifying the hand of the user.

The state of the object may, for example, comprise one or more of its location (e.g., its position expressed within a particular coordinate system), its pose (e.g., position and orientation), movement characteristics (e.g., velocity or direction of travel), landmark information, or other state information, such as, in the case of a hand, handedness, an identified gesture, or the like.

In some examples, activation of the low-power mode comprises dynamically selecting a subset of cameras of the multi-camera object tracking system for determining the state of the object. The XR device may implement a dynamic switching function to cycle between different subset of cameras, based on the object tracking data. By reducing the number of cameras selected or used (e.g., used for sampling and processing) at a given point in time, an overall processing load of the XR device can be reduced, improving power consumption and, at least in some cases, reducing storage or memory requirements (e.g., due to reduced sampling).

As mentioned, the state of the object may include a location of the object, e.g., its position with reference to a particular coordinate system or frame of reference, or the pose of the object. The object tracking data may include a predicted location or predicted pose of the object within a reference coordinate system of the XR device. The XR device may generate the predicted location of the object using historic tracking data or a predicted pose of the XR device, or combinations thereof. In some examples, a subset of cameras of the multi-camera object tracking system is selected based on the predicted location or predicted pose of the object, e.g., the predicted location relative to a field of view of each respective camera of the multi-camera object tracking system.

The multi-camera object tracking system may be config-
ured to follow movements of an object in real time, e.g., by
using a bounding box to enclose the object in video frames.
One or more object tracking algorithms of the multi-camera
object tracking system may use image processing techniques
to both detect and track the object. Examples described
herein provide techniques for reducing power consumption
of a multi-camera object tracking system that can be applied
during a detection phase (e.g., when the object is identified),
during a tracking phase (e.g., when the object is "followed"
after it has been identified), or during both the detection and
tracking phases. The term "object tracking" is thus used
herein to refer to detection of an object, tracking of an
object, or both detection and tracking, as the context may
indicate.

The XR device may implement different low-power
modes or techniques for a detection phase and a tracking
phase. For example, the XR device may execute a first mode
until the object is detected, and automatically switch to a
second mode while tracking the object post-detection.

During a tracking phase, the multi-camera object tracking
system may project, for each camera of the multi-camera
object tracking system and based on a predetermined cali-
bration of the camera, a predicted three-dimensional loca-
tion of the object onto a two-dimensional camera view
image to obtain a two-dimensional projected location. The
multi-camera object tracking system may then dynamically
select, based on the projected locations, a subset of cameras
of the multi-camera object tracking system for use in track-
ing, e.g., with respect to a current frame. Selection of the
subset of cameras may include determining, for each camera
of the multi-camera object tracking system, a distance
between the projected location and a reference location
within the respective camera view image, with the camera
being included in the subset of cameras if the determined
distance for the camera meets a predefined condition.

In some examples, each camera in the subset of cameras
is selected based on the projected location relative to at least
one reference location within the respective camera view
image. The camera may be selected based on the projected
location meeting a predefined condition. The predefined
condition may be one of: a distance between the projected
location and the at least one reference location is less than
a threshold value; a difference between the distance between
the projected location and the at least one reference location
for one or more other cameras of the multi-camera object
tracking system and the distance between the projected
location and the at least one reference location for the
camera exceeds a threshold value; or the projected location
is within (or outside of, depending on the implementation)
a predetermined zone in the respective camera view image
relative to the at least one reference location.

In some examples, the camera is only selected based on
the predefined condition being met with respect to multiple
consecutive frames. In other words, in some cases, the
multi-camera object tracking system may only switch
between cameras after monitoring a condition across mul-
tiple frames, e.g., to reduce the number of camera switches.

Projecting the predicted location of the object may
include projecting at least one point of interest associated
with the object onto the camera view image and determining
a bounding box associated with the at least one point of
interest. A distance between the bounding box and the at
least one reference location within the respective camera
view image may be determined, and each camera in the
subset of cameras may be selected based on the determined
distance for that particular camera.

In some examples, an XR device is a head-wearable XR
device that utilizes multiple cameras to track objects or other
targets of interest, e.g., to apply augmentations (e.g., image
filters, overlays, or modifications) to target objects or areas
displayed to a user via an AR application on the XR device.

Power consumption may be reduced by implementing a
low-power mode of an XR device as described herein, e.g.,
by dynamically and intelligently selecting only a subset of
cameras for image capturing or image processing at a given
point in time or for a given phase. Examples described
herein provide a balance between power consumption and
performance of a multi-camera object tracking system. In
this way, technical problems of improving battery life or
freeing up processing resources, or both, can be addressed or
alleviated. One or more of the methodologies described
herein may thus obviate a need for certain efforts or com-
puting resources. Examples of such computing resources
include processor cycles, network traffic, memory usage,
data storage capacity, power consumption, network band-
width, or cooling capacity.

FIG. 1 is a network diagram illustrating a network envi-
ronment 100 suitable for operating an XR device 110,
according to some examples. The network environment 100
includes an XR device 110 and a server 112, communica-
tively coupled to each other via a network 104. The server
112 may be part of a network-based system. For example,
the network-based system may be or include a cloud-based
server system that provides additional information, such as
virtual content (e.g., three-dimensional models of virtual
objects, or augmentations to be applied as virtual overlays
onto images depicting real-world scenes) to the XR device
110.

A user 106 operates the XR device 110. The user 106 may
be a human user (e.g., a human being), a machine user (e.g.,
a computer configured by a software program to interact
with the XR device 110), or any suitable combination
thereof (e.g., a human assisted by a machine or a machine
supervised by a human). The user 106 is not part of the
network environment 100, but is associated with the XR
device 110.

The XR device 110 may be a computing device with a
display such as a smartphone, a tablet computer, or a
wearable computing device (e.g., watch or glasses). The
computing device may be hand-held or may be removably
mounted to a head of the user 106. In one example, the
display may be a screen that displays what is captured with
a camera of the XR device 110. In another example, the
display of the device may be transparent or semi-transparent
such as in lenses of wearable computing glasses. In other
examples, the display may be a transparent display such as
a windshield of a car, plane, truck. In another example, the
display may be non-transparent and wearable by the user to
cover the field of vision of the user.

The user 106 operates an application of the XR device
110. The application may include an AR application con-
figured to provide the user 106 with an experience triggered
or enhanced by a physical object 108, such as a two-
dimensional physical object (e.g., a picture), a three-dimen-
sional physical object (e.g., a statue), a location (e.g., at
factory), or any references (e.g., perceived corners of walls
or furniture, QR codes) in the real-world physical environ-
ment. For example, the user 106 may point a camera of the
XR device 110 to capture an image of the physical object
108 and a virtual overlay may be presented over the physical
object 108 via the display. Certain experiences may also be
triggered, enhanced or controlled by a hand of the user 106.
Accordingly, it will be appreciated that the "physical object"

or real-world object being tracked or detected by the XR device 110 may be the hand of the user 106.

To allow the user 106 to interact with virtual objects, the XR device 110 may detect the positions and movements of one or both hands of the user 106 and use those hand positions and movements to determine the user's intentions in manipulating the virtual objects. In some examples, the interaction of a user with the AR application can be achieved using a 3D user interface, as described with reference to FIG. 14 and FIG. 15 below.

The XR device 110 includes tracking components (not shown). The tracking components track the pose (e.g., position and orientation) of the XR device 110 relative to the real-world environment 102 using image sensors (e.g., depth-enabled 3D camera and image camera), inertial sensors (e.g., gyroscope, accelerometer, or the like), wireless sensors (e.g., Bluetooth™ or Wi-Fi), GPS sensor, and audio sensor.

In some examples, the server 112 may be used to detect and identify the physical object 108 based on sensor data (e.g., image and depth data) from the XR device 110, determine a pose of the XR device 110 and the physical object 108 based on the sensor data. The server 112 can also generate a virtual object based on the pose of the XR device 110 and the physical object 108. The server 112 communicates the virtual object to the XR device 110. The XR device 110 or the server 112, or both, can also perform image processing, object detection and object tracking functions based on images captured by the XR device 110 and one or more parameters internal or external to the XR device 110. The object recognition, tracking, and virtual content rendering can be performed on either the XR device 110, the server 112, or a combination between the XR device 110 and the server 112. Accordingly, while certain functions are described herein as being performed by either an XR device or a server, the location of certain functionality may be a design choice. For example, it may be technically preferable to deploy particular technology and functionality within a server system initially, but later to migrate this technology and functionality to a client installed locally at the XR device where the XR device has sufficient processing capacity.

The XR device 110 and the server 112 may each be implemented in a computer system, in whole or in part, as described below with respect to FIG. 17. Moreover, any two or more of the machines, components, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 112), databases, and devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
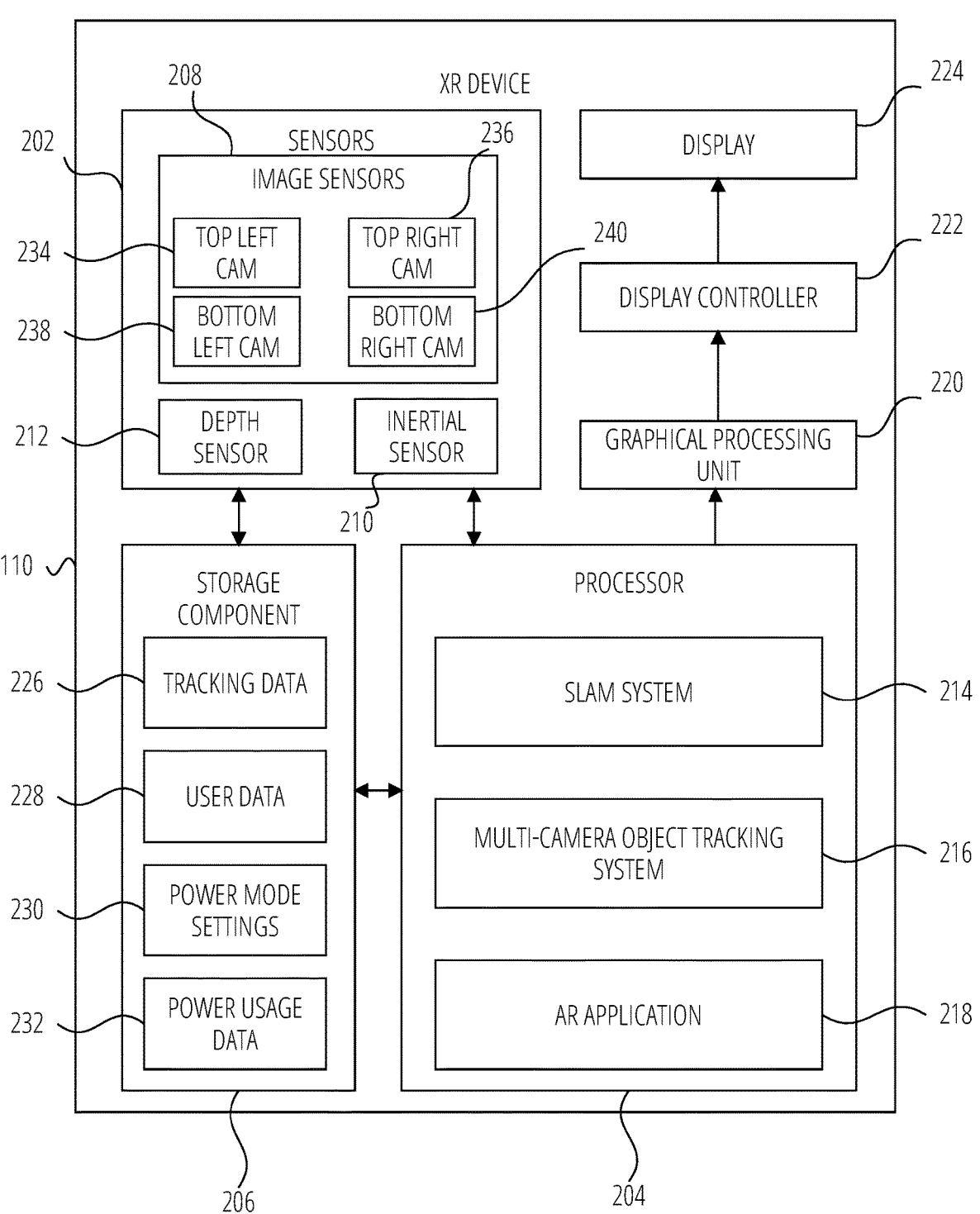
FIG. 2 is a block diagram illustrating certain components of an XR device, according to some examples.

FIG. 2 is a block diagram illustrating components of the XR device 110, according to some examples. The XR device 110 includes sensors 202, a processor 204, a storage component 206, a graphical processing unit 220, a display controller 222, and a display 224.

Any one or more of the components described herein may be implemented using hardware (e.g., a processor of a machine) or a combination of hardware and software. For example, any component described herein may configure a processor to perform the operations described herein for that component. Moreover, any two or more of these components may be combined into a single component, and the functions described herein for a single component may be subdivided among multiple components. Furthermore, according to various examples, components described herein as being implemented within a single machine, database, or device may be distributed across multiple machines, databases, or devices.

The sensors 202 include multiple image sensors 208, one or more inertial sensors 210, and one or more depth sensors 212. The image sensors 208 include multiple cameras (e.g., RGB cameras). FIG. 2 shows a top left camera 234, a top right camera 236, a bottom left camera 238, and a bottom right camera 240 of the XR device 110. In the context of FIG. 2, terms such as "top left" and "bottom right" refer to the relative position of each camera from the perspective of a user of the XR device 110, e.g., a user wearing the XR device 110. However, it will be appreciated that XR devices may, in other examples, include other cameras or other camera arrangements, e.g., only two cameras, six cameras, or eight cameras.

The inertial sensor 210 includes a combination of a gyroscope, accelerometer, and a magnetometer. In some examples, the inertial sensor 210 includes one or more IMU. An IMU is a device that can report on the inertial status of a moving body, including the acceleration, velocity, orientation, and position of the moving body. An IMU enables tracking of movement of a body by integrating the acceleration and the angular velocity measured by the IMU. The values obtained from one or more gyroscopes of the IMU can be processed to obtain the pitch, roll, and heading of the IMU and, therefore, of the body with which the IMU is associated. Signals from one or more accelerometers of the IMU can be processed to obtain velocity and displacement of the IMU.

The depth sensor 212 includes a combination of a structured-light sensor, a time-of-flight sensor, passive stereo sensor, and an ultrasound device. Other examples of sensors 202 include a proximity or location sensor (e.g., near field communication, GPS, Bluetooth™, or Wi-Fi), an audio sensor (e.g., a microphone), a motion sensor, an eye-tracking sensor, or any suitable combination thereof. It is noted that the sensors 202 described herein are for illustration purposes and the sensors 202 are thus not limited to the ones described above.

The processor 204 implements at least some aspects of a SLAM system 214, a multi-camera object tracking system 216, and an AR application 218. The SLAM system 214 may be used to build a map of the real-world environment and to locate the XR device 110 within the real world. The SLAM system 214 estimates and continuously tracks a pose of the XR device 110. For example, the SLAM system 214 uses image data from the image sensors 208 and inertial data from the inertial sensor 210 to track a location and pose of the XR device 110 relative to a frame of reference (e.g., real-world environment 102). This facilitates, for example, accurate placement of virtual content overlaid, or superimposed, on the real world and tracking of their position as a user moves and/or as objects move.

The XR device 110 may include a "VIO" (Visual-Inertial Odometry) system that combines data from the inertial sensor 210 and the image sensors 208 to estimate the position and orientation of an object in real-time. In some examples, a VIO system may form part of the SLAM system 214, e.g., to perform the "Localization" function of the SLAM system 214. The SLAM system 214 may provide the three-dimensional pose of the XR device 110 to the graphical processing unit 220.

The multi-camera object tracking system 216 enables the detection and tracking of an object, e.g., the physical object 108 or a hand of a user. The multi-camera object tracking system 216 may include a computer-operated application or system that enables a device or system to detect and track visual features identified in images captured by the image sensors 208. In some examples, the multi-camera object tracking system 216 works with the SLAM system 214 to build a model of a real-world environment based on the tracked visual features. The multi-camera object tracking system 216 may implement one or more object tracking machine learning models to track an object in the field of view of a user during a user session.

To implement the multi-camera object tracking system 216, multiple cameras (e.g., the top left camera 234, top right camera 236, bottom left camera 238, and bottom right camera 240) can be strategically placed on the XR device 110, e.g., on a frame of the XR device 110. The cameras may be arranged to increase an overall field of view and provide partially overlapping coverage. During operation, the cameras capture video frames of the real-world environment 102 at a specified frame rate (which may differ between cameras). The frames are then processed by the multi-camera object tracking system 216 to extract visual features or other information using one or more computer vision techniques. Examples of such techniques include template matching, edge detection, and feature point extraction. The multi-camera object tracking system 216 may employ stereo matching techniques to facilitate or provide depth estimation.

The multi-camera object tracking system 216 may implement two phases of object tracking: a detection phase in which the object of interest (e.g., the hand of the user 106) is identified, and a tracking phase in which the pose of the object is tracked over a period of time. Various algorithms, including algorithms implemented by object tracking machine learning models as mentioned above, may be used to predict or estimate the movement or pose of the object and to update the pose of the object over time.

Examples disclosed herein provide for the multi-camera object tracking system 216 to implement a low-power mode to reduce power consumption of, or associated with, the multi-camera object tracking system 216, e.g., power consumption of the image sensors 208 or power consumption due to processing of image data by the processor 204. The low-power mode is activated based on object tracking data. The object tracking data may include one or more of the following data: detection data indicating whether an object has been detected, a predicted location of the object within a 3D reference coordinate system of the XR device 110, a predicted appearance zone of the object, predicted motion of the object, handedness data of the user 106 of the XR device 110 that identifies a hand of the user 106; historic power consumption data for at least one camera of the multi-camera object tracking system 216; or expected inference performance for at least one camera of the multi-camera object tracking system 216 with respect to the object. Examples of the manner in which the low-power mode may be implemented are provided with reference to FIGS. 3-10 below.

Still referring to FIG. 2, the display 224 includes a screen or monitor configured to display images generated by the processor 204. In some examples, the display 224 may be transparent or semi-transparent so that the user 106 can see through the display 224 (in AR use cases). In another example, the display 224, such as a LCOS (Liquid Crystal on Silicon) display, presents each frame of virtual content in multiple presentations. It will be appreciated that an XR device may include multiple displays, e.g., in the case of AR glasses, a left eye display and a right eye display. A left eye display may be associated with a left lateral side camera, with frames captured by the left lateral side camera being processed specifically for the left eye display. Likewise, the right eye display may be associated with a right lateral side camera, with frames captured by the right lateral side camera being processed specifically for the right eye display.

The AR application 218 may retrieve virtual objects (e.g., a 3D object model). Virtual objects may be retrieved based on an identified physical object 108 or physical environment (or other real-world feature), or based on other aspects of user context, such as hand gestures. The AR application 218 may also retrieve an augmentation to apply to real-world features, such as the physical object 108. The graphical processing unit 220 causes display of the virtual object, augmentation, or the like. The graphical processing unit 220 may include a render engine that is configured to render a frame of a model of a virtual object based on the virtual content provided by the AR application 218 and the pose of the XR device 110 (and, in some cases, the position of a tracked object). In other words, the graphical processing unit 220 uses the 3D pose of the XR device 110 and other data, as required, to generate frames of virtual content to be presented on the display 224.

For example, the graphical processing unit 220 uses the 3D pose to render a frame of the virtual content such that the virtual content is presented at an orientation and position in the display 224 to properly augment the user's reality. As an example, the graphical processing unit 220 may use the 3D pose data to render a frame of virtual content such that, when presented on the display controller 222, the virtual content is caused to be presented to a user so as to overlap with a physical object in the user's real-world environment 102. The graphical processing unit 220 can generate updated frames of virtual content based on updated poses of the XR device 110 and updated tracking data generated by the abovementioned tracking components, which reflect changes in the position and orientation of the user 106 in relation to physical objects in the user's real-world environment 102, thereby resulting in a more immersive experience.

The display controller 222 may be positioned as an intermediary between display 224 and the graphical processing unit 220. The display controller 222 may receive the image data (e.g., rendered frame) from the graphical processing unit 220, re-project the frame (e.g., by performing a warping process) based on a latest pose of the XR device 110 (and, in some cases, object tracking pose forecasts or predictions), and provide the re-projected frame to the display 224. A display arrangement that includes the display 224 includes one or more other optical components, such as mirrors, lenses, and so forth, depending on the implementation.

It will be appreciated that, in examples where an XR device includes multiple displays, each display may have a dedicated graphical processing unit and/or display controller. It will further be appreciated that where an XR device includes multiple displays, e.g., in the case of AR glasses or any other AR device that provides binocular vision to mimic the way humans naturally perceive the world, a left eye display arrangement and a right eye display arrangement may deliver separate images or video streams to each eye. Where an XR device includes multiple displays, steps or operations may be carried out separately and substantially in parallel for each display, in some examples, and pairs of features or components may be included to cater for both eyes.

For example, an XR device may capture separate images for a left eye display and a right eye display (or for a set of right eye displays and a set of left eye displays), and render separate outputs for each eye to create a more immersive experience and to adjust the focus and convergence of the overall view of a user for a more natural, three-dimensional view. Thus, while a single set of display arrangement components, or a single set of output images, may be discussed to describe some examples, similar techniques may be applied to cover both eyes by providing a further set of display arrangement components.

Still referring to FIG. 2, the storage component 206 may store various data, such as tracking data 226, user data 228, power mode settings 230, and power usage data 232. The tracking data 226 includes, for example, object tracking information from previously captured frames. The user data 228 includes, for example, details of the handedness data of the user 106 or gestures associated with the user 106. The power mode settings 230 include, for example, rules governing when or how to switch between different power modes, including the low-power mode of the multi-camera object tracking system 216. The power usage data 232 may include data indicative of the power usage associated with one or more components of the XR device 110, e.g., the image sensors 208 or the processor 204.

Figure 3:
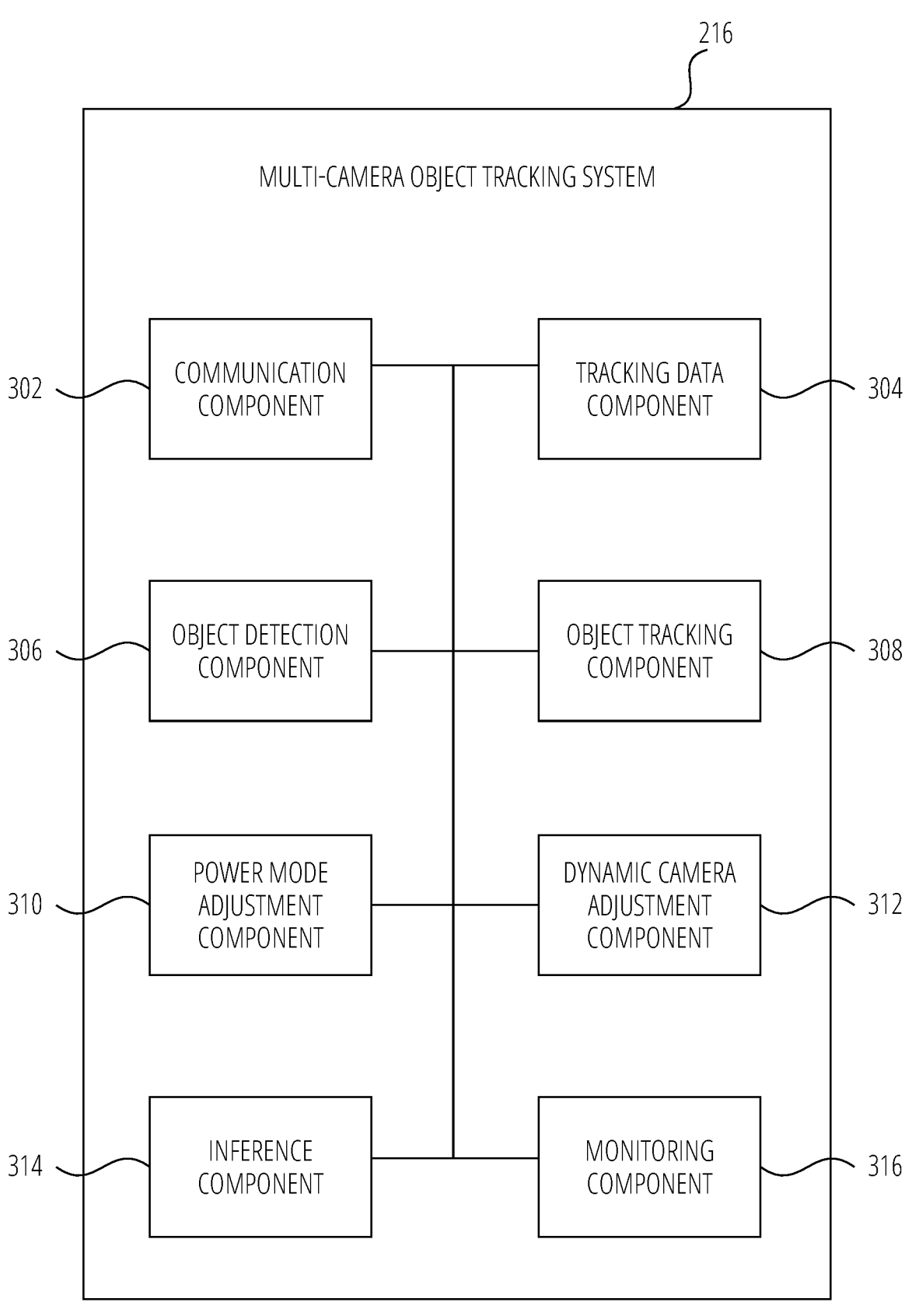
FIG. 3 is a block diagram illustrating certain components of a multi-camera object tracking system of an XR device, according to some examples.

FIG. 3 is a block diagram illustrating certain components of the multi-camera object tracking system 216, according to some examples. The multi-camera object tracking system 216 is shown to include a communication component 302, a tracking data component 304, a power mode adjustment component 310, a dynamic camera adjustment component 312, an object detection component 306, an object tracking component 308, an inference component 314, and a monitoring component 316. It is noted that the components in FIG. 3 are illustrative of possible components and not intended to provide an exhaustive indication of such possible components.

In some examples, at least some of the components shown in FIG. 3 are configured to communicate with each other to implement aspects described herein. Any one or more of the components described herein may be implemented using hardware (e.g., one or more processors of one or more machines) or a combination of hardware and software. For example, any component described herein may be implemented by a processor configured to perform the operations described herein for that component. Moreover, any two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

The communication component 302 enables the multi-camera object tracking system 216 to communicate with other components of the XR device 110. For example, the multi-camera object tracking system 216 may receive image data from the image sensors 208 and stored data from the storage component 206. The multi-camera object tracking system 216 may send control instructions to other components of the XR device 110, e.g., instructions to activate or deactivate one or more of the image sensors 208, or to adjust sampling or processing settings of the image sensors 208.

The tracking data component 304 obtains tracking data, e.g., image data and inertial data, originating from the sensors 202. The tracking data component 304 may also access the stored data from the storage component 206, e.g., to access handedness data of the user 106, and send data to the storage component 206 for storage.

The multi-camera object tracking system 216 uses the object detection component 306 and the object tracking component 308 to perform detection and tracking of objects, respectively, as described in greater detail elsewhere herein. The power mode adjustment component 310 is responsible for adjusting a power mode of the multi-camera object tracking system 216. The power mode adjustment component 310 may adjust the power mode between a standard power mode, in which the image sensors 208 are used in a conventional manner, and one or more low-power modes. The multi-camera object tracking system 216 may be able to switch between different types of low-power modes, and examples described herein are thus not limited to a single low-power mode.

Examples provide for the power mode adjustment component 310 to analyze object tracking data and to activate the low-power mode based on the object tracking data. The object detection component 306 or the object tracking component 308 may perform detection or tracking according to the mode activated by the power mode adjustment component 310.

In some examples, in a low-power mode, the multi-camera object tracking system 216 selectively switches between different image sensors 208 for determining the state of an object in the real-world environment 102. Specifically, the dynamic camera adjustment component 312 may implement dynamic switching between different cameras of the XR device 110, e.g., for sampling or image processing purposes, thereby to reduce power consumption (relative to the standard power mode in which all cameras are used at "full performance").

In some examples, and in accordance with a selected low-power mode of the XR device 110, the dynamic camera adjustment component 312 may be used to execute a dynamic switching function to determine a state of an object, e.g., to detect or track the pose of the object. The dynamic switching function may cause the XR device 110 to switch between different subsets of cameras of the multi-camera object tracking system to determine the state of the object, such that, at a first point in time a first subset of the cameras is selected to determine the state of the object, and at a second point in time a second subset of the cameras is selected to determine the state of the object. Examples of the dynamic switching function are described in greater detail below.

In some examples, the dynamic camera adjustment component 312 may execute different functions during a detection phase and a tracking phase, respectively. For example, the dynamic camera adjustment component 312 may dynamically cycle through the cameras of the multi-camera object tracking system 216 based on a determined sequence during the detection phase, and then automatically switch, in the tracking phase, to another function that causes one or more of the cameras of the XR device 110 to be deactivated.

The multi-camera object tracking system 216 may utilize various types of object tracking data to determine a low-power mode suitable for use in object detection or tracking. The object tracking data may include or indicate a current system status, details of a scene or real-world environment, motion-trajectory of the object, predicted location or pose of the object, sensor details, and so forth. For example, where the multi-camera object tracking system 216 detects a high motion scenario, the power mode adjustment component 310 may adjust the power mode to the standard mode in which all cameras are used and image data is sampled at a high frequency. On the other hand, where the multi-camera object tracking system 216 detects a low motion scenario, the power mode adjustment component 310 may adjust the power mode to a low-power mode in which only a subset of cameras is used, some frames are skipped, or a combination thereof.

As another example, the multi-camera object tracking system 216 may detect that a camera of the XR device 110 is occluded and select one or more other cameras that are not (or less) occluded for object detection or tracking. In some examples, the multi-camera object tracking system 216 may detect, from the object tracking data, a current user session context, and determine a suitable power mode based on the current user session context. For example, the multi-camera object tracking system 216 may determine that hand size calibration of a hand of the user 106 is required. In response to determining that hand size calibration is required, the power mode adjustment component 310 may activate the standard mode in which a plurality of the cameras (or all cameras) of the XR device 110 is used simultaneously to facilitate quick or accurate calibration.

Examples described herein provide for various power reduction options. A dynamic switching function may reduce the power consumption of the XR device 110 by reducing camera usage, reducing a processing load, or both. In some examples, one or more cameras of the XR device 110 are turned off based on the activation of the low-power mode. Image processing or pre-processing may also be reduced or deactivated, e.g., by eliminating or reducing auto-exposure, image resizing, white balance, auto-focus, digital signal processing, or other operations, for cameras that are not selected at a given point in time or for a given phase. In some examples, one or more cameras may be "throttled" in a low-power mode, e.g., instead of running at 60 Hz, a camera (or a selected subset of cameras) may be throttled by the multi-camera object tracking system 216 to run at 10 Hz. Another power reduction option, in some examples, is to process images at a smaller image resolution in the low-power mode, compared to an image resolution that is used in a standard power mode.

Accordingly, it is noted that the "selection" of a camera or subset of cameras, in the context of determining the state of an object, may have different effects, depending on the implementation. For example, if a camera is selected for determining the state of the object, it may be used for sampling (e.g., processing of a frame recorded or captured by that camera) at a given point in time or in a given phase, while a camera that is not selected is not used for sampling at that point in time or in that phase. The camera that is not used for sampling may then be placed in an idle mode or even deactivated (e.g., switched off), in some examples, to reduce power consumption. Alternatively, if a camera is selected, its sampling frequency may be adjusted relative to a camera that is not selected, or a sampling sequence associated with the camera may be defined or adjusted relative to one or more other cameras.

Activation of a low-power mode of a multi-camera object tracking system may thus include reducing a sampling rate of at least a subset of cameras of the multi-camera object tracking system. Alternatively or additionally, activation of a low-power mode may include activating a reduced image processing setting (e.g., processing at a lower resolution or only processing certain zones of incoming frames) for at least a subset of cameras of the multi-camera object tracking system.

The inference component 314 may be used to generate tracking estimates or predictions, e.g., to predict the location or pose of a tracked object. As mentioned, the XR device 110 may utilize one or more object tracking machine learning models for this purpose. An object tracking machine learning model may comprise a neural network trained on suitable training data to identify and track objects in a sequence of frames captured by the XR device 110. The machine learning model may, in some examples, be known as a core tracker. A core tracker is used in computer vision systems to track the movement of an object in a sequence of images or videos. It typically uses an object's appearance, motion, landmarks, and/or other features to estimate location in subsequent frames. The pose of a tracked object may be transformed to a coordinate system of the XR device 110 to calculate a relative position of the object.

The monitoring component 316 may be used to monitor various aspects of performance of the XR device 110. For example, the monitoring component 316 may monitor power consumption associated with the image sensors 208 of the XR device 110 and cause power usage data 232 to be stored in the storage component 206.

FIG. 4 is a flow diagram illustrating a method 400 suitable for reducing power consumption of an XR device during an object detection phase, according to some examples. Operations in the method 400 may be performed by the XR device 110 using components (e.g., parts, modules, systems, or engines) described above with respect to FIGS. 1 and 2. Accordingly, by way of example and not limitation, the method 400 is described with reference to the XR device 110 and certain components thereof.

As mentioned, the term "object tracking" may refer to detection of an object of interest. A detection phase may involve identifying the presence and location of the object, e.g., in one or more frames of a video stream. Object detection algorithms, such as object proposals or sliding windows, or machine learning models, e.g., deep learning-based models, may be used for this purpose. In some examples, a bounding box is generated around the detected object. The detection phase may be different from the tracking phase in that the multi-camera object tracking system 216 does not have "prior knowledge," or has limited "prior knowledge," about the object or its location.

The method 400 commences at opening loop element 402 and proceeds to operation 404, where the XR device 110 commences with an object detection phase. For example, the XR device 110 may commence with detection of a hand of the user 106 such that hand tracking can be performed thereafter. Hand tracking is an important aspect of many XR experiences. For example, the AR application 218 of the XR device 110 may rely on hand gestures to provide an interactive AR experience to the user 106.

The XR device 110 accesses object tracking data (operation 406) and selects, based on the object tracking data, a low-power mode of the multi-camera object tracking system 216, at operation 408. For example, the object tracking data may indicate that the object of interest has not yet been detected, resulting in the multi-camera object tracking system 216 activating a detection-specific low-power mode. As another example, the object tracking data may indicate a predicted appearance zone of the object, e.g., where handedness data indicates that the user 106 is left-handed, the hand is expected to appear from a bottom left region of a camera field of view. In response, the multi-camera object tracking system 216 may activate a low-power mode in which cameras are selected specifically to focus on the predicted appearance zone.

At operation 410, the selected low-power mode is activated. In the method 400 of FIG. 4, the selected low-power mode corresponds to a dynamic switching function. The multi-camera object tracking system 216 executes the dynamic switching function (operation 412) to periodically switch between different subsets of cameras of the XR device 110 during the detection phase, e.g., while running the relevant detection algorithms on incoming frames. By implementing the dynamic switching function, the XR device 110 may consume less power than it would have consumed in the absence of camera switching (e.g., in a standard power mode in which all cameras are run and sampled at full capacity). Examples of the dynamic switching function are described with reference to FIGS. 5-7 below.

The object of interest is then detected at operation 414. For example, based on processing of images captured according to the dynamic switching function, and using other sensor data, such as inertial data or depth data from the sensors 202, the multi-camera object tracking system 216 determines a location or pose of the object relative to the XR device 110. Responsive to detecting the object, the XR device 110 automatically transitions from object detection to object tracking at operation 416. The method 400 ends at closing loop element 418.

Figure 5:
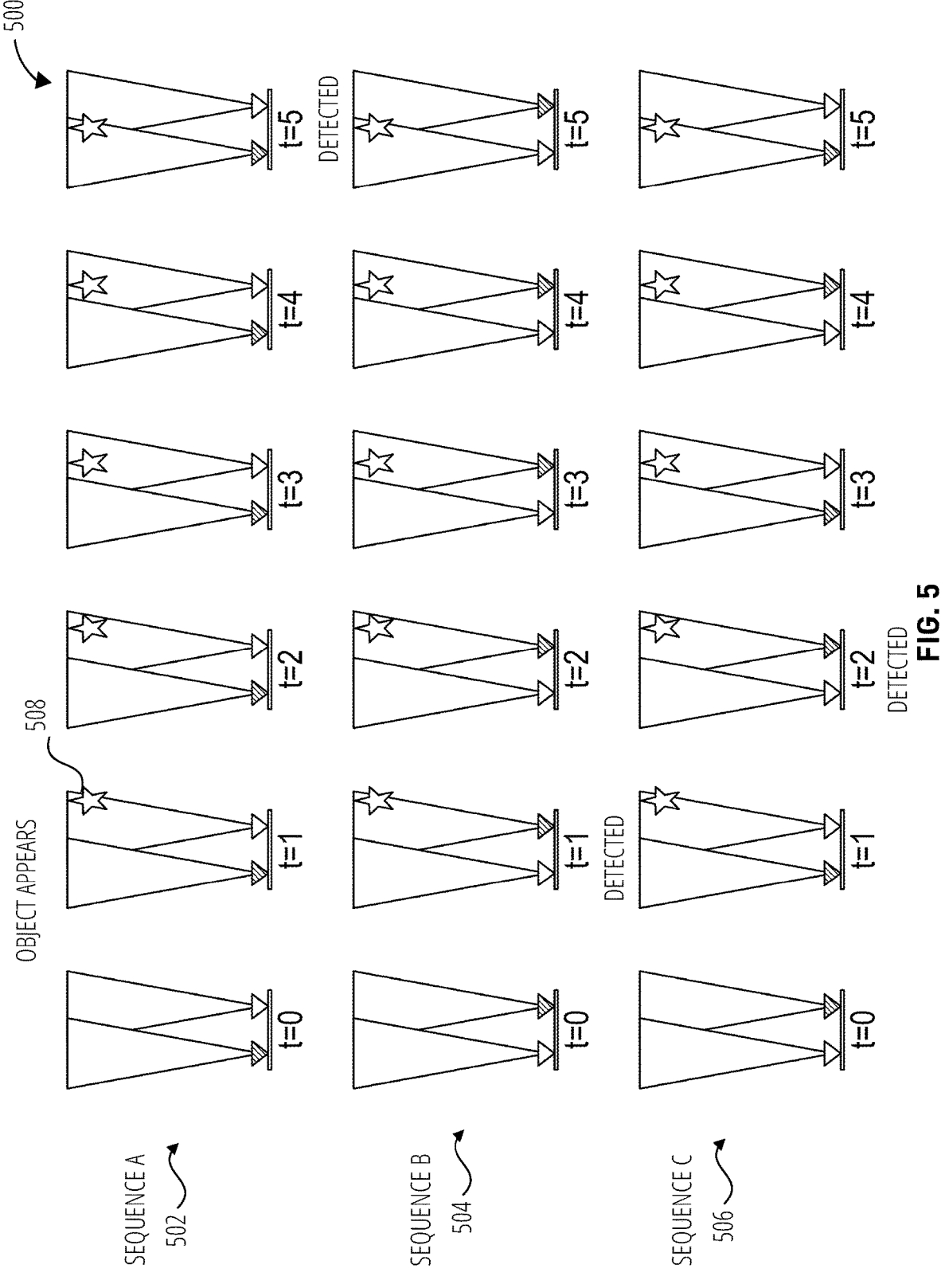
FIG. 5 is a diagrammatic illustration of the detection of a real-world object using three different modes of a multi-camera object tracking system, according to some examples.

FIG. 5 is a diagrammatic illustration of the detection of a real-world object using three different modes of a multi-camera object tracking system, according to some examples. The object is represented by a star graphical element. In FIG. 5, the multi-camera object tracking system has access to two cameras: a left camera and a right camera of an XR device. FIG. 5 includes a sequence diagram 500 that presents three separate image detection sequences, identified in FIG. 5 as sequence A 502, a sequence B 504, a sequence C 506, respectively.

As explained above, at the start of a detection phase, a location of the object of interest may still be unknown. Using both cameras of the XR device simultaneously may enable optimal detection, but result in relatively high power consumption. The modes described with reference to FIG. 5 are low-power modes that may be used to reduce power consumption, while still allowing for object detection.

Each sequence 502, 504, 506 shown in FIG. 5 depicts a field of view of the left camera and the right camera, respectively, at different points in time (t=0 to t=5). The fields of view partially overlap with each other. An object of interest 508 appears in the field of view of the right camera at time point "t=1" and gradually moves to the left, ultimately also appearing in the field of view of the left camera at time point "t=5."

Referring firstly to sequence A 502, the sequence A 502 corresponds to a low-power mode in which only the left camera is selected during the detection phase. Accordingly, in sequence A 502, the multi-camera object tracking system samples only from the left camera. The right camera may thus be deactivated or adjusted to an idle mode, or the multi-camera object tracking system may simply not process the images captured by the right camera. When using the low-power mode of sequence A 502, the multi-camera object tracking system will only be able to detect the object of interest 508 at time point "t=5" (once the object of interest 508 is captured by the left camera).

Turning to sequence B 504, the sequence B 504 corresponds to a low-power mode in which only the right camera is selected during the detection phase. Accordingly, in sequence B 504, the multi-camera object tracking system samples only from the right camera. When using the low-power mode of sequence B 504, the multi-camera object tracking system will be able to detect the object of interest 508 at time point "t=1" (once the object of interest 508 is captured by the right camera).

Turning to sequence C 506, the sequence C 506 corresponds to a low-power mode in which the multi-camera object tracking system dynamically switches between the left camera and the right camera during the detection phase. Accordingly, in sequence C 506, the multi-camera object tracking system uses the right camera at time point "t=0," the left camera at time point "t=1," the right camera at time point "t=2" and so forth. When using the low-power mode of sequence C 506, the multi-camera object tracking system will be able to detect the object of interest 508 at time point "t=2," given that the right camera is not selected at time point "t=1."

In some examples, a multi-camera object tracking system may thus perform dynamic camera selection for object detection. This may result in reduced power consumption, while still providing acceptable performance. For example, if the mode of sequence C 506 in FIG. 5 is employed, power consumption may be significantly reduced given that each particular camera is used for sampling only approximately 50% of the time, while still ensuring that a wide field of view is covered for detecting the object of interest 508. Furthermore, objects are viewed from different perspectives, improving the probability that an object will be seen from an advantageous viewpoint for detection (e.g., more visible features, better distinction from the background, or less occlusion than when the object is viewed from another viewpoint). It is noted that the exact sampling rate, sequence or cycle may be adjusted depending on requirements, e.g., power usage requirements or tracking performance requirements.

Figures 6, 7:
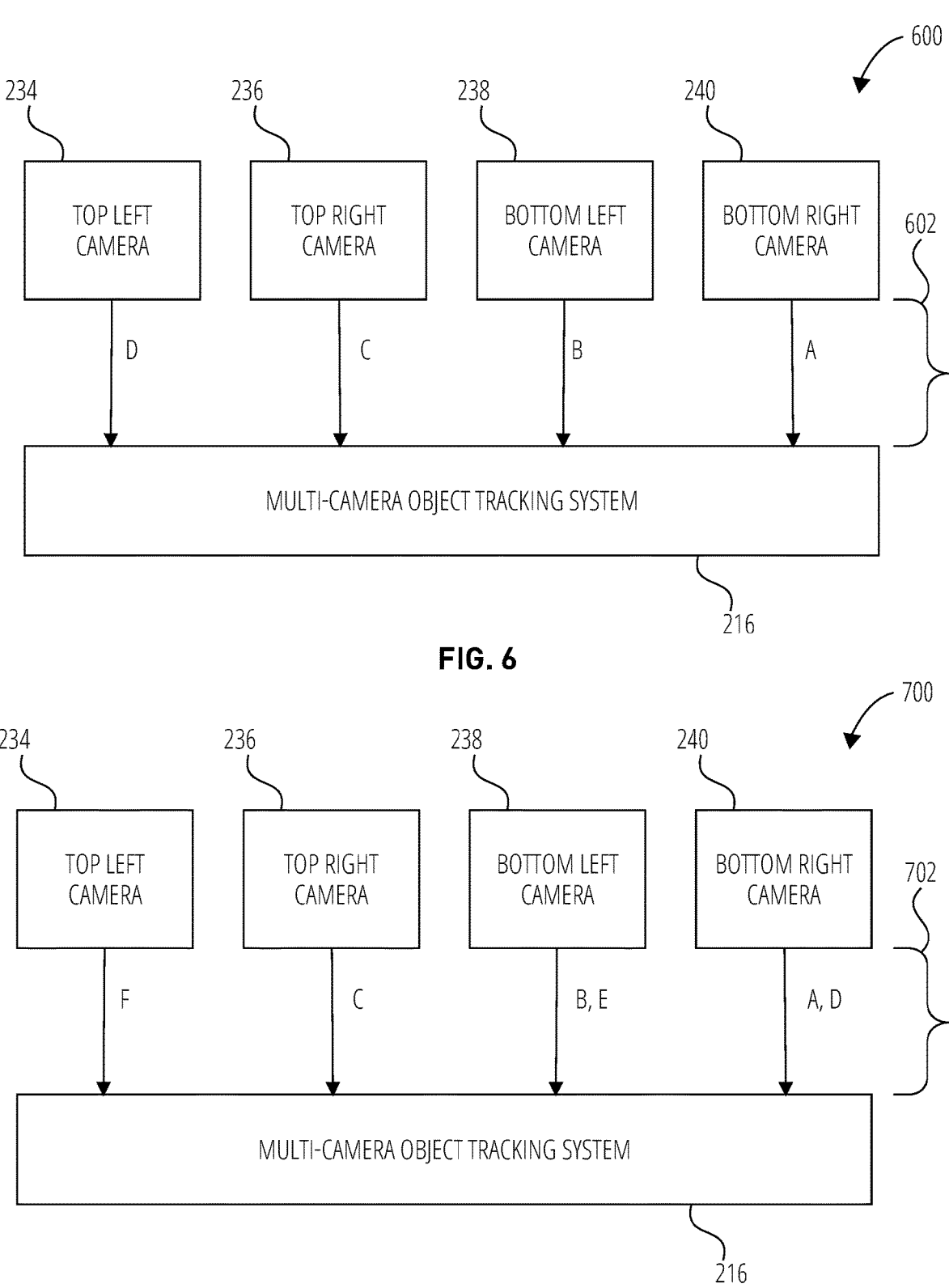
FIG. 6 is a sequence diagram illustrating a sampling sequence of a dynamic switching function executed using four cameras associated with a multi-camera object tracking system, according to some examples.
FIG. 7 is a sequence diagram illustrating a sampling sequence of a dynamic switching function executed using four cameras associated with a multi-camera object tracking system, according to some examples.

FIG. 6 is a sequence diagram 600 illustrating a sampling sequence 602 of a dynamic switching function executed using four cameras associated with the multi-camera object tracking system 216, according to some examples. In FIG. 6, the cameras are the top left camera 234, the top right camera 236, the bottom left camera 238, and the bottom right camera 240 of FIG. 2. However, it is noted that the sampling sequence 602 may be applied in other XR devices or multi-camera object tracking systems.

The sampling sequence 602 defines the manner in which the multi-camera object tracking system 216 samples from each camera 234, 236, 238, 240, e.g., records or selects frames for use during a detection phase or tracking phase. The sampling sequence 602 defines the following order, as indicated by the letters A to D in FIG. 6: bottom right camera 240 (A), then the bottom left camera 238 (B), then the top right camera 236 (C), and then the top left camera 234 (D). For example, the bottom right camera 240 may be sampled at time point "t=0," the bottom left camera 238 may be sampled at time point "t=1," and so forth, according to the sampling sequence 602. The sampling sequence 602 may be repeated any suitable number of times.

Thus, in the sampling sequence 602, while the cameras 234, 236, 238, 240 are all active while the sampling sequence 602 is ongoing, the multi-camera object tracking system 216 only records or stores frames from one camera at a time based on the sampling sequence 602. This may be effected, for example, by aligning the sampling rate of each camera 234, 236, 238, 240 with the sampling sequence 602, or by allowing the cameras 234, 236, 238, 240 to record at a higher sampling rate, but only processing selected frames from each camera 234, 236, 238, 240 in accordance with the sampling sequence 602.

Accordingly, in some examples, and as shown in FIG. 6, the multi-camera object tracking system 216 may sample evenly from available camera streams, reducing the sampling rate associated with each respective camera 234, 236, 238, 240, and thus the power consumption associated with the multi-camera object tracking system 216.

Deactivating (e.g., turning off) cameras for certain periods may also reduce power consumption. In some examples, instead of keeping all the cameras 234, 236, 238, 240 active and adjusting or configuring sampling rates of the cameras 234, 236, 238, 240 to generate the sampling sequence 602, the cameras 234, 236, 238, 240 may be rapidly activated and deactivated. In other words, the relevant camera may only be turned on when it is actually selected or needed, based on the defined sampling sequence 602. Such a configuration may be useful, for example, where activating and deactivating cameras do not have a significant adverse effect on XR device performance while achieving power savings.

In some examples, the dynamic switching function causes the XR device 110 to cycle through different subsets of cameras of the multi-camera object tracking system 216 in a sequence that is based on the object tracking data. FIG. 7 is a sequence diagram 700 illustrating a sampling sequence 702 of a dynamic switching function executed using four cameras associated with multi-camera object tracking system 216, according to some examples, wherein the sequence is defined based on object tracking data in the example form of a predicted appearance zone. In FIG. 7, the cameras are the top left camera 234, the top right camera 236, the bottom left camera 238, and the bottom right camera 240 of FIG. 2. However, it is noted that the sampling sequence 702 may be applied in other XR devices or multi-camera object tracking systems.

The sampling sequence 702 defines the manner in which the multi-camera object tracking system 216 samples from each camera 234, 236, 238, 240. In FIG. 7, the multi-camera object tracking system 216 accesses object tracking data providing a predicted appearance zone. Specifically, in FIG. 7, the multi-camera object tracking system 216 determines that the object of interest (e.g., a hand of the user 106) is likely to appear from the bottom of a scene captured by the XR device 110. Based on this object tracking data, the multi-camera object tracking system 216 establishes the sampling sequence 702 such that the bottom left camera 238 and the bottom right camera 240 are sampled more frequently than the top left camera 234 and the top right camera 236.

The sampling sequence 702 defines the following order, as indicated by the letters A to F in FIG. 7: bottom right camera 240 (A), then the bottom left camera 238 (B), then the top right camera 236 (C), then the bottom right camera 240 again (D), then the bottom left camera 238 again (E), then the top left camera 234 (F). The sampling sequence 702 may be repeated any suitable number of times.

As described with reference to the sequence diagram 600 of FIG. 6, in the sampling sequence 702, while the cameras 234, 236, 238, 240 are all active while the sampling sequence 702 is ongoing, the multi-camera object tracking system 216 only records or stores frames from one camera at a time based on the sampling sequence 602. However, the sampling sequence 702 differs from the sampling sequence 602 in that the multi-camera object tracking system 216 does not sample the cameras evenly, and instead samples from the bottom left camera 238 and the bottom right camera 240 approximately twice as many times as from the top left camera 234 and the top right camera 236, per sampling sequence 702.

As with the sampling sequence 602 of FIG. 6, the sampling sequence 702 of FIG. 7 may also be achieved by deactivating the cameras 234, 236, 238, 240 and only activating them when they are needed or selected, based on the defined sequence 702. Thus, in some embodiments, the cameras 234, 236, 238, 240 need not be active at all times.

A sampling or selection sequence can thus be defined or customized based on one or more items of object tracking data, e.g., prior information about power consumption, expected inference performance per camera, the predicted appearance zone of the object, or handedness data of the user. Referring to the handedness data example, the multi-camera object tracking system 216 could determine that the user 106 is left-handed, and thus define or execute a sampling sequence in which cameras on the left side of the XR device 110 are sampled more frequently than those on the right side.

As mentioned, the term "object tracking" may refer to tracking of an object of interest after detection or identification of the object, e.g., tracking a location or pose of the object as it moves relative to the XR device 110. A tracking phase may involve continuously estimating the pose of the object, e.g., using tracking algorithms, such as optical flow, correlation filters, or deep learning-based methods. These techniques may utilize object tracking data from previous frames and, in some cases, assumptions or predictions about the object (e.g., assuming a constant velocity of the object), to predict the location or pose of the object in a current or target frame. A bounding box generated for the object may be continuously updated during tracking.

It is noted that a detection phase may be more computationally costly than a tracking phase, given that, for example, the detection phase usually involves searching for the object in the entire image (or at least in a larger part of the image), requiring processing of all (or more) pixels of the image, in contrast with the tracking phase in which a previous location or pose of the object is already known. It may thus be preferable to run the multi-camera object tracking system 216 in a tracking phase as opposed to a detection phase to the extent possible. In some examples, the multi-camera object tracking system 216 may remain in the tracking phase for as long as (a) the object of interest is being tracked and (b) the multi-camera object tracking system 216 is sufficiently confident about the location or pose of the object of interest. If the multi-camera object tracking system 216 is not sufficiently confident about the location or pose of the object of interest, e.g., it is able to track the pose but only with a confidence level that is below a predetermined threshold, the multi-camera object tracking system 216 may switch back to the detection phase.

FIG. 8 is a flow diagram illustrating a method 800 suitable for reducing power consumption of an XR device during an object tracking phase, according to some examples. Operations in the method 800 may be performed by the XR device 110 using components (e.g., parts, modules, systems, or engines) described above with respect to FIGS. 1 and 2. Accordingly, by way of example and not limitation, the method 800 is described with reference to the XR device 110 and certain components thereof.

The method 800 commences at opening loop element 802 and proceeds to operation 804, where the multi-camera object tracking system 216 of the XR device 110 commences with object tracking. For example, and referring to operation 416 of FIG. 4, the operation 804 may commence once the XR device 110 has transitioned from object detection to object tracking.

At operation 806, the multi-camera object tracking system 216 activates a low-power mode for tracking of an object of interest. In the method 800 of FIG. 8, the multi-camera object tracking system 216 utilizes object tracking data in the form of historic tracking data to execute tracking in the low-power mode. Tracking in the low-power mode involves dynamically switching between different subsets of the image sensors 208 of the XR device 110, based at least partially on a predicted location of the object being tracked.

The multi-camera object tracking system 216 accesses the historic tracking data, e.g., from the storage component 206, at operation 808, and processes the historic tracking data (operation 810) to predict a current object location. For example, the multi-camera object tracking system 216 may predict the pose of the object in the real-world environment 102 for current or target frame based on its pose in previous frames and, in some cases, based on certain assumptions, such as an assumption that the object is traveling at a constant velocity or in a certain trajectory.

The multi-camera object tracking system 216 then uses the predicted location of the object to execute a distance algorithm for determining which subset of the image sensors 208 to select for the current or target frame (operation 812). For example, the distance algorithm may involve, for each camera of the multi-camera object tracking system 216, projecting the 3D predicted location of the object to a two-dimensional (2D) camera view image for that particular camera. In other words, the multi-camera object tracking system 216 may translate the predicted location of the object in the real world onto a camera view image, or onto an image plane associated with the particular camera, to obtain the predicted location as it would appear on an image captured by the particular camera. This may be referred to as a 2D projected location. It is noted that the multi-camera object tracking system 216 may utilize the pose of the XR device 110 to calculate where a particular 3D point should appear on the 2D plane of a camera. The 2D projected location may be obtained by applying, for example, a projection matrix to the 3D coordinates of the relevant object. The matrix may be a result of intrinsic and extrinsic parameters, at least some of which are obtained through calibration, as further described below.

Further, the distance algorithm may involve, for the particular camera, determining the distance between the 2D projected location and a reference location, e.g., the center of the camera view image. The multi-camera object tracking system 216 then selects one or more cameras for the current or target frame based on a result of the distance algorithm. For example, the multi-camera object tracking system 216 may select the camera that has the shortest distance between the 2D projected location and the reference location, and use only the image from the selected camera for tracking in the current or target frame.

The multi-camera object tracking system 216 may include a camera in the subset of cameras if the determined distance for that camera meets a predefined condition. For example, the multi-camera object tracking system 216 may include a camera in the selected subset if the determined distance (e.g., between the 2D projected location and the reference location) is less than a threshold value, or if the determined distance for the camera is less than the determined distance for one or more other cameras of the multi-camera object tracking system 216 (e.g., if the determined distance for the particular camera is the least, thus meaning that the 2D projected location is the nearest the center of the image for that particular camera).

In some examples, the predefined condition is that the difference between the following values should exceed a threshold value:

the distance between the projected location and the reference location for another camera of the multi-camera object tracking system; and the distance between the projected location and the at least one reference location for the camera in question.

Another example of a predefined condition is that the projected location is within or outside of a predetermined area or zone in the image. For example, the camera may be selected if the projected location is within a certain safety margin from the borders of the image.

The multi-camera object tracking system 216 proceeds to track the object across a series of frames (operation 814). The multi-camera object tracking system 216 may execute the distance algorithm again for each new frame, or periodically based on a predefined time period, while taking into account changes in the location of the object and the pose of the XR device 110, and dynamically adjust the selected subset of cameras while tracking is in progress. In other words, the subset of cameras selected for a first target frame may differ from a subset of cameras selected for a second, subsequent target frame. In this way, the multi-camera object tracking system 216 may reduce power consumption, while ensuring accurate or efficient object tracking.

The multi-camera object tracking system 216 may generate object tracking data over time and provide the object tracking data to the AR application 218 for downstream use. For example, the object tracking data may include an object bounding box for each frame that reflects the position (and, over time, movement) of the object. The object tracking data may also include the pose of the object. The multi-camera object tracking system 216 may thus feed object tracking data to the AR application 218 (operation 816). The AR application 218 may then use the object tracking data, e.g., together with the pose of the XR device 110 (e.g., as determined by the SLAM system 214), for downstream operations, such as rendering virtual content to a user 106 of the XR device 110 to be presented via the display 224 as overlaid on the tracked object. The method 800 concludes at closing loop element 818.

It is noted that, in the method 800, the multi-camera object tracking system 216 may implement techniques to reduce the number of camera switches, e.g., by considering the result of a distance algorithm, or whether the relevant condition is met, over multiple different frames before a switch. Examples of such techniques are described below.

It is noted that while the operations of FIG. 4 and FIG. 8 are described with reference to the XR device 110 of FIG. 1 and FIG. 2, it shall be appreciated that at least some of the operations of the method 400 or the method 800 may be deployed on various other hardware configurations or be performed by similar components residing elsewhere. The term "operation" is used to refer to elements in the drawings of this disclosure for ease of reference and it will be appreciated that each "operation" may identify one or more operations, processes, actions, or steps, and may be performed by one or multiple components.

Figures 9, 10:
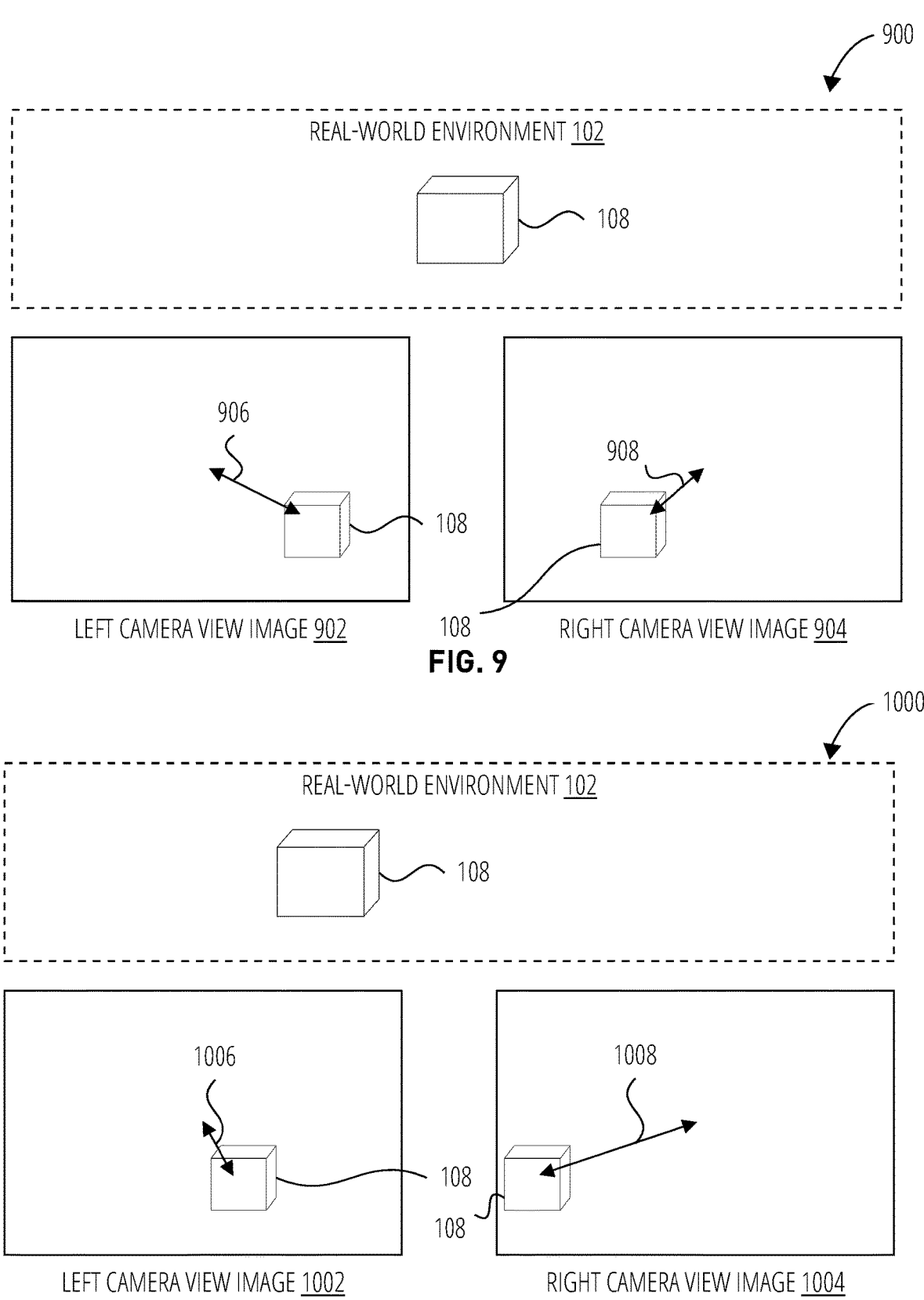
FIG. 9 is a diagrammatic illustration of movement of a real-world object that is tracked using a multi-camera object tracking system, according to some examples.
FIG. 10 is a diagrammatic illustration of movement of a real-world object that is tracked using a multi-camera object tracking system, according to some examples.

FIG. 9 and FIG. 10 diagrammatically illustrate movement of a real-world object that is tracked using a multi-camera object tracking system, according to some examples. In FIG. 9 and FIG. 10, the object is the physical object 108 of FIG. 1, and the multi-camera object tracking system is a multi-camera object tracking system of an XR device that includes two cameras: a left camera and a right camera. Based on the location and movement of the physical object 108, the multi-camera object tracking system dynamically selects one of the left camera or the right camera for tracking with respect to a particular frame. The XR device then uses only the captured image from the selected camera for tracking purposes with respect to that frame.

Referring firstly to FIG. 9, the physical object 108 is shown in the diagram 900 the real-world environment 102. The location of the physical object 108 in FIG. 9 is the predicted location in 3D for a current frame, e.g., based on previous tracking results and a predicted pose of the XR device.

The 3D location of the physical object 108 in the real-world environment 102, as predicted by the multi-camera object tracking system for the current frame, is then projected onto a left camera view image 902 associated with the left camera and a right camera view image 904 associated with the right camera.

It will be appreciated that predetermined calibrations and/or transformations stored for each respective camera may be used by the multi-camera object tracking system to generate or update these 2D projections, together with other data such as the pose of the XR device. In some examples, the predicted 3D location of the physical object 108 in the real-world environment 102 is a 3D position in a defined coordinate system that can be related in a specific manner to each respective camera view based on predefined or predetermined calibrations, e.g., during setup of the cameras of the multi-camera object tracking system or in some offline calibration step. Calibration data may include data such as camera extrinsics (e.g., relative transformations between the cameras), intrinsics (e.g., focal length or principal point), lens distortion parameters, or combinations thereof.

Given that the cameras are located at different positions on the XR device, the left camera view image 902 and the right camera view image 904 cover different, but partially overlapping, fields of view. The multi-camera object tracking system then executes a distance algorithm to identify the camera view image (e.g., the image plane of the respective camera) in which the 2D projected location is the most central. The phrase "most central" may refer to the image in which the 2D projected location is furthest away from the image borders. In FIG. 9, the multi-camera object tracking system determines that a first distance 906, which is the distance between the 2D projected location of the physical object 108 and the center point in the left camera view image 902, is greater than a second distance 908, which is the distance between the 2D projected location of the physical object 108 and the center point in the right camera view image 904. The multi-camera object tracking system thus determines that the physical object 108 is predicted to be "most central" in the right camera view image 904 in the current frame, and dynamically selects the right camera for object tracking with respect to the current frame.

Referring now to FIG. 10, the diagram 1000 shows the physical object 108 in the real-world environment 102 with respect to a subsequent frame (after the frame of FIG. 9). It will be noted, when comparing FIG. 9 and FIG. 10, that the physical object 108 has moved from right to left in the real-world environment 102. Accordingly, the physical object 108 has moved in a corresponding manner within a left camera view image 1002 and a right camera view image 1004 associated with the subsequent frame.

The multi-camera object tracking system executes the same distance algorithm as described with reference to FIG.

9. However, in the case of FIG. 10, the multi-camera object tracking system determines that a first distance 1006, which is the distance between the 2D projected location of the physical object 108 and the center point in the left camera view image 1002, is greater than a second distance 1008, which is the distance between the 2D projected location of the physical object 108 and the center point in the right camera view image 1004. The multi-camera object tracking system thus determines that the physical object 108 is predicted to be "most central" in the left camera view image 1002 in the subsequent frame, and dynamically selects the left camera for object tracking.

In some examples, the distance algorithm as described herein aims to reduce the risk of the object moving out of a camera's field of view before a new frame arrives. It is noted that the use of the center point of the camera view image (and thus determining the "most central" projection) is merely an example of a reference location within a 2D camera view image. In other examples, the distance algorithm may consider distances with respect to other reference locations, such as corners or edges of the camera view image, e.g., to determine the image in which the projected location of the object is furthest from a particular corner or edge of the camera view image.

Further, in some examples, the multi-camera object tracking system may consider multiple reference locations instead of a single reference location, such as the center of the image, in determining whether to select a camera or whether to switch between cameras. For example, the multi-camera object tracking system may be configured to generate a heatmap across the relevant image that returns a score for each projected location. For example, the multi-camera object tracking system may implement a pixel heatmap such that the heatmap value is 1 at the pixel of the image center, and 0 at the image border. The values may vary between 1 and 0 between these points, e.g., they may linearly decrease the further a pixel is from the image center. In other examples, a step function may be used, where the value is 1 within a predefined area at and/or near the center of the image and then jumps to 0 for pixels close to the image border. The object may then be scored by assessing its projected location for each camera based on the heatmap, and the multi-camera object tracking system may select or switch to a camera (or cameras) whose image provides the highest/best score.

In some examples, a switching strategy may be implemented in which a current tracking camera keeps tracking the object for as long as a predefined condition is met, e.g., for as long as the object is within a predefined area or zone of the image, e.g., relative to some reference location. For example, the current camera may keep tracking the object while the object's bounding box is fully within the image field of view minus a predetermined safety margin. In such a case, only when the bounding box (or another set of projected reference points) moves outside of the predetermined area will the multi-camera object tracking system automatically switch to another camera (or cameras) that does not violate this constraint. This may be done to reduce the number of camera switches.

Alternatively, or additionally, to reduce the number of camera switches, a hysteresis switching function may be implemented, in terms of which the multi-camera object tracking system does not switch cameras immediately once the distance algorithm (or another algorithm, depending on the implementation) reveals that another camera should be selected. Instead, the function may dictate that switching should only take place if or once the difference between the distance provided by the current camera and the distance provided by the other camera exceeds a certain threshold.

In some examples, the multi-camera object tracking system may consider multiple frames before switching to another camera, e.g., to reduce the number of camera switches. For example, if the multi-camera object tracking system is currently tracking an object in the left camera, but a switching function or distance algorithm indicates that the right camera should be used for the next frame, the multi-camera object tracking system may wait until the right camera has been output or "recommended" by the switching function or distance algorithm for a predetermined number of frames, e.g., consecutive frames, before actually switching to the right camera.

These and other techniques may be implemented to facilitate a reduction in camera switching frequency, while still reducing overall power consumption.

Several different approaches may be used to project the location of the physical object 108 onto each camera view image. For example, the multi-camera object tracking system may project different 3D points associated with the physical object 108 onto each image and compute an enclosing bounding box. Where the object is a hand, these 3D points may, for example, be hand landmarks. In such cases, the distance algorithm may calculate the distance between the relevant reference location, e.g., camera view image center, and the relevant 2D bounding box center. As another example, a centroid of the 3D physical object 108, based on its predicted location in the real world, can be projected directly onto each camera view image. In such cases, the distance algorithm may calculate the distance between the relevant reference location, e.g., camera view image center, and the projected centroid.

Figure 11:
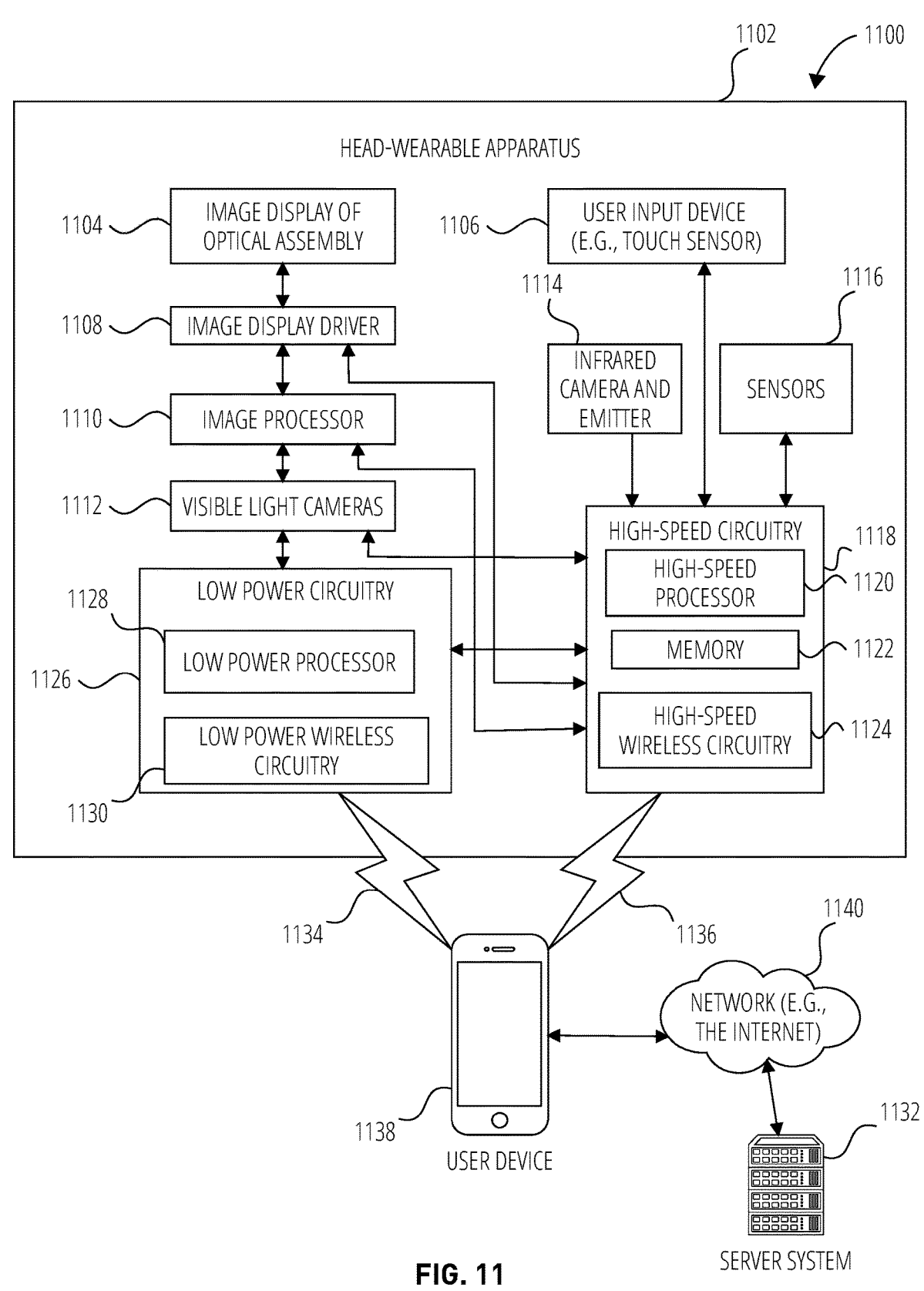
FIG. 11 diagrammatically illustrates a network environment in which a head-wearable apparatus can be implemented, according to some examples.

FIG. 11 illustrates a network environment 1100 in which a head-wearable apparatus 1102 can be implemented according to some examples. FIG. 11 provides a high-level functional block diagram of an example head-wearable apparatus 1102 communicatively coupled a mobile user device 1138 and a server system 1132 via a suitable network 1140. At least some of the techniques described herein may be performed using the head-wearable apparatus 1102 or a network of devices similar to those shown in FIG. 11.

The head-wearable apparatus 1102 includes cameras, such as visible light cameras 1112, an infrared camera and emitter 1114 and sensors 1116. The user device 1138 can be capable of connecting with the head-wearable apparatus 1102 using both a communication link 1134 and a communication link 1136. The user device 1138 is connected to the server system 1132 via the network 1140. The network 1140 may include any combination of wired and wireless connections.

The head-wearable apparatus 1102 includes two displays of image display of optical assembly 1104. The two displays include one associated with the left lateral side and one associated with the right lateral side of the head-wearable apparatus 1102. The head-wearable apparatus 1102 also includes an image display driver 1108, an image processor 1110, low-power circuitry 1126, and high-speed circuitry 1118. The two displays of the image display of optical assembly 1104 are for presenting images and videos, including an image that can provide a graphical user interface to a user of the head-wearable apparatus 1102.

The image display driver 1108 commands and controls the image display of the image display of optical assembly 1104. The image display driver 1108 may deliver image data directly to each image display of the image display of optical assembly 1104 for presentation or may have to convert the image data into a signal or data format suitable for delivery to each image display device. For example, the image data may be video data formatted according to compression formats, such as H. 264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

Figure 12:
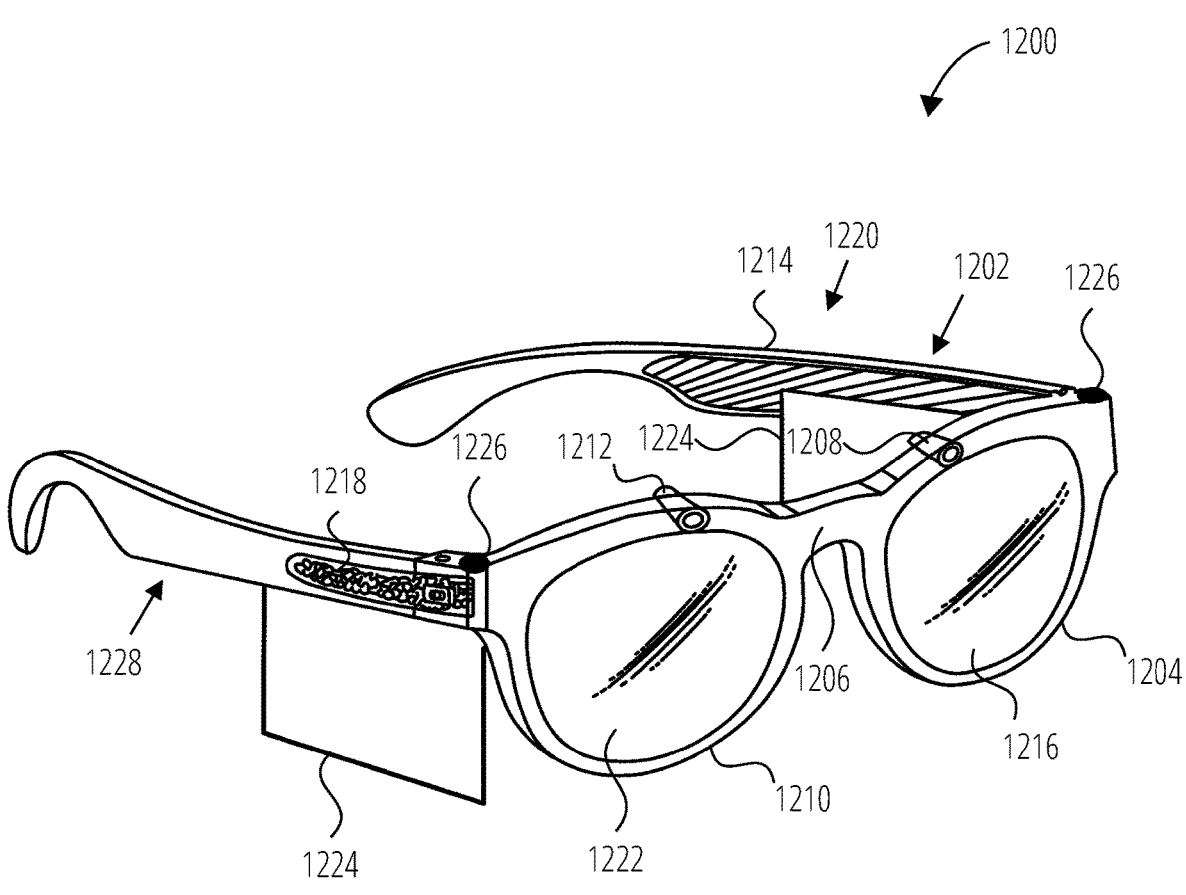
FIG. 12 is a perspective view of a head-worn device, according to some examples.
Figure 13:
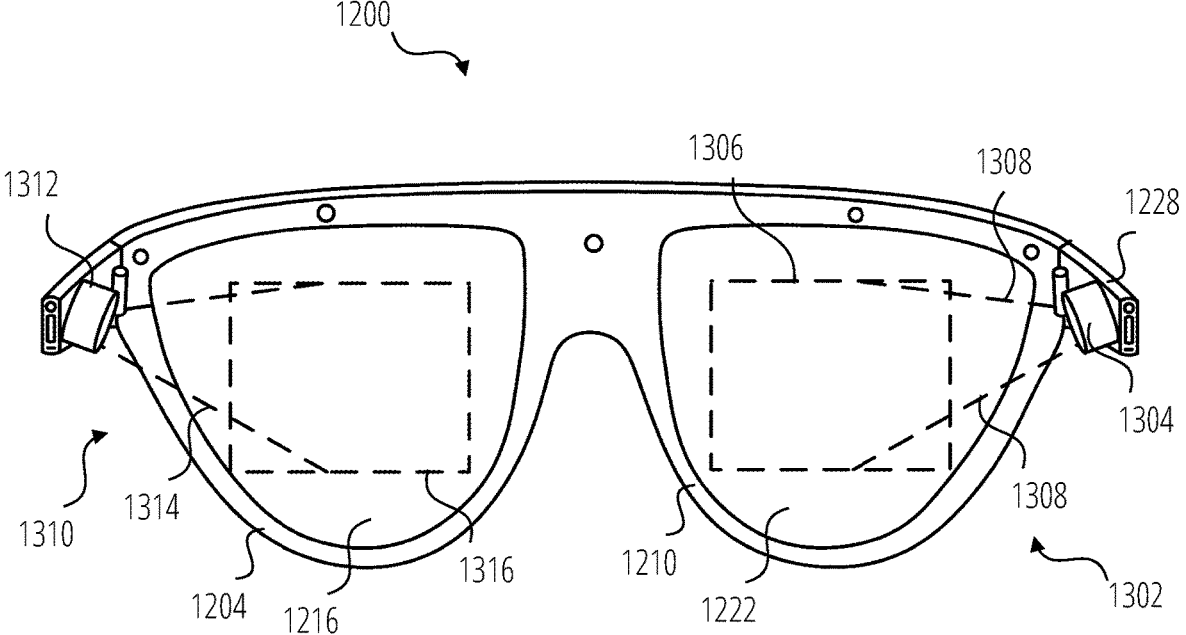
FIG. 13 illustrates a further view of the head-worn device of FIG. 12, showing the device from the perspective of a user, according to some examples.

The head-wearable apparatus 1102 may include a frame and stems (or temples) extending from a lateral side of the frame (see FIG. 12 and FIG. 13 which show an apparatus according to some examples). The head-wearable apparatus 1102 of FIG. 11 further includes a user input device 1106 (e.g., touch sensor or push button) including an input surface on the head-wearable apparatus 1102. The user input device 1106 is configured to receive, from the user, an input selection to manipulate the graphical user interface of the presented image.

The components shown in FIG. 11 for the head-wearable apparatus 1102 are located on one or more circuit boards, for example a printed circuit board (PCB) or flexible PCB, in the rims or temples. Alternatively, or additionally, the depicted components can be located in the chunks, frames, hinges, or bridge of the head-wearable apparatus 1102. Left and right sides of the head-wearable apparatus 1102 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1102 includes a memory 1122 which stores instructions to perform a subset or all of the functions described herein. The memory 1122 can also include a storage device. As further shown in FIG. 11, the high-speed circuitry 1118 includes a high-speed processor 1120, the memory 1122, and high-speed wireless circuitry 1124. In FIG. 11, the image display driver 1108 is coupled to the high-speed circuitry 1118 and operated by the high-speed processor 1120 in order to drive the left and right image displays of the image display of optical assembly 1104. The high-speed processor 1120 may be any processor capable of managing high-speed communications and operation of any general computing system needed for the head-wearable apparatus 1102. The high-speed processor 1120 includes processing resources needed for managing high-speed data transfers over the communication link 1136 to a wireless local area network (WLAN) using high-speed wireless circuitry 1124. In certain examples, the high-speed processor 1120 executes an operating system such as a LINUX operating system or other such operating system of the head-wearable apparatus 1102 and the operating system is stored in memory 1122 for execution. In addition to any other responsibilities, the high-speed processor 1120 executing a software architecture for the head-wearable apparatus 1102 is used to manage data transfers with high-speed wireless circuitry 1124. In certain examples, high-speed wireless circuitry 1124 is configured to implement Institute of Electrical and Electronic Engineers (IEEE) 1102.11 communication standards, also referred to herein as Wi-Fi. In other examples, other high-speed communications standards may be implemented by high-speed wireless circuitry 1124.

The low-power wireless circuitry 1130 and the high-speed wireless circuitry 1124 of the head-wearable apparatus 1102 can include short range transceivers (Bluetooth™) and wireless wide, local, or wide area network transceivers (e.g., cellular or Wi-Fi). The user device 1138, including the transceivers communicating via the communication link 1134 and communication link 1136, may be implemented using details of the architecture of the head-wearable apparatus 1102, as can other elements of the network 1140.

The memory 1122 includes any storage device capable of storing various data and applications, including, among other things, camera data generated by the visible light cameras 1112, sensors 1116, and the image processor 1110, as well as images generated for display by the image display driver 1108 on the image displays of the image display of optical assembly 1104. While the memory 1122 is shown as integrated with the high-speed circuitry 1118, in other examples, the memory 1122 may be an independent stand-alone element of the head-wearable apparatus 1102. In certain such examples, electrical routing lines may provide a connection through a chip that includes the high-speed processor 1120 from the image processor 1110 or low-power processor 1128 to the memory 1122. In other examples, the high-speed processor 1120 may manage addressing of memory 1122 such that the low power processor 1128 will boot the high-speed processor 1120 any time that a read or write operation involving memory 1122 is needed.

As shown in FIG. 11, the low-power processor 1128 or high-speed processor 1120 of the head-wearable apparatus 1102 can be coupled to the cameras (visible light cameras 1112, or infrared camera and emitter 1114), the image display driver 1108, the user input device 1106 (e.g., touch sensor or push button), and the memory 1122. The head-wearable apparatus 1102 also includes sensors 1116, which may be the motion components 1734, position components 1738, environmental components 1736, and biometric components 1732, e.g., as described below with reference to FIG. 17. In particular, motion components 1734 and position components 1738 are used by the head-wearable apparatus 1102 to determine and keep track of the position and orientation (the "pose") of the head-wearable apparatus 1102 relative to a frame of reference or another object, in conjunction with a video feed from one of the visible light cameras 1112, using for example techniques such as structure from motion (SfM) or visual-inertial odometry (VIO).

In some examples, and as shown in FIG. 11, the head-wearable apparatus 1102 is connected with a host computer. For example, the head-wearable apparatus 1102 is paired with the user device 1138 via the communication link 1136 or connected to the server system 1132 via the network 1140. The server system 1132 may be one or more computing devices as part of a service or network computing system, for example, that include a processor, a memory, and network communication interface to communicate over the network 1140 with the user device 1138 and head-wearable apparatus 1102.

The user device 1138 includes a processor and a network communication interface coupled to the processor. The network communication interface allows for communication over the network 1140, communication link 1134 or communication link 1136. The user device 1138 can further store at least portions of the instructions for implementing functionality described herein.

Output components of the head-wearable apparatus 1102 include visual components, such as a display (e.g., a liquid crystal display (LCD)), a plasma display panel (PDP), a light emitting diode (LED) display, a projector, or a waveguide. The image displays of the optical assembly are driven by the image display driver 1108. The output components of the head-wearable apparatus 1102 further include acoustic components (e.g., speakers), haptic components (e.g., a vibratory motor), other signal generators, and so forth. The input components of the head-wearable apparatus 1102, the user device 1138, and server system 1132, such as the user input device 1106, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1102 may optionally include additional peripheral device elements. Such peripheral device elements may include biometric sensors, additional sensors, or display elements integrated with the head-wearable apparatus 1102. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 1136 from the user device 1138 via the low power wireless circuitry 1130 or high-speed wireless circuitry 1124.

FIG. 12 is a perspective view of a head-worn AR device in the form of glasses 1200, in accordance with some examples. The glasses 1200 can include a frame 1202 made from any suitable material such as plastic or metal, including any suitable shape memory alloy. In one or more examples, the frame 1202 includes a first or left optical element holder 1204 (e.g., a display or lens holder) and a second or right optical element holder 1210 connected by a bridge 1206. A first or left optical element 1216 and a second or right optical element 1222 can be provided within respective left optical element holder 1204 and right optical element holder 1210. The right optical element 1222 and the left optical element 1216 can be a lens, a display, a display assembly, or a combination of the foregoing. Any suitable display assembly can be provided in the glasses 1200.

The frame 1202 additionally includes a left arm or temple piece 1220 and a right arm or temple piece 1228. In some examples, the frame 1202 can be formed from a single piece of material so as to have a unitary or integral construction.

The glasses 1200 can include a computing device, such as a computer 1218, which can be of any suitable type so as to be carried by the frame 1202 and, in some examples, of a suitable size and shape, so as to be partially disposed in one of the temple piece 1220 or the temple piece 1228. The computer 1218 can include one or more processors with memory, wireless communication circuitry, and a power source. As discussed with reference to FIG. 11 above, the computer 1218 may comprise low-power circuitry, high-speed circuitry, and a display processor. Various other examples may include these elements in different configurations or integrated together in different ways. Additional details of aspects of the computer 1218 may be implemented as illustrated by the head-wearable apparatus 1102 discussed above.

The computer 1218 additionally includes a battery 1214 or other suitable portable power supply. In some examples, the battery 1214 is disposed in left temple piece 1220 and is electrically coupled to the computer 1218 disposed in the right temple piece 1228. The glasses 1200 can include a connector or port (not shown) suitable for charging the battery 1214 a wireless receiver, transmitter or transceiver (not shown), or a combination of such devices.

The glasses 1200 include a first or left camera 1208 and a second or right camera 1212. Although two cameras are depicted, other examples contemplate the use of a single or additional (i.e., more than two) cameras. In some examples, the glasses 1200 include any number of input sensors or other input/output devices in addition to the left camera 1208 and the right camera 1212. Such sensors or input/output devices can additionally include biometric sensors, location sensors, motion sensors, and so forth. In some examples, the left camera 1208 and the right camera 1212 provide video frame data for use by the glasses 1200 to extract 3D information from a real-world scene, to track objects, to determine relative positions between objects, etc.

The glasses 1200 may also include a touchpad 1224 mounted to or integrated with one or both of the left temple piece 1220 and right temple piece 1228. The touchpad 1224 is generally vertically-arranged, approximately parallel to a user's temple in some examples. As used herein, generally vertically aligned means that the touchpad is more vertical than horizontal, although potentially more vertical than that. Additional user input may be provided by one or more buttons 1226, which in the illustrated examples are provided on the outer upper edges of the left optical element holder 1204 and right optical element holder 1210. The one or more touchpads 1224 and buttons 1226 provide a means whereby the glasses 1200 can receive input from a user of the glasses 1200.

FIG. 13 illustrates the glasses 1200 from the perspective of a user. For clarity, a number of the elements shown in FIG. 12 have been omitted. As described in FIG. 12, the glasses 1200 shown in FIG. 13 include left optical element 1216 and right optical element 1222 secured within the left optical element holder 1204 and the right optical element holder 1210 respectively.

The glasses 1200 include forward optical assembly 1302 comprising a right projector 1304 and a right near eye display 1306, and a forward optical assembly 1310 including a left projector 1312 and a left near eye display 1316.

In some examples, the near eye displays are waveguides. The waveguides include reflective or diffractive structures (e.g., gratings and/or optical elements such as mirrors, lenses, or prisms). Light 1308 emitted by the projector 1304 encounters the diffractive structures of the waveguide of the near eye display 1306, which directs the light 1308 towards the right eye of a user to provide an image on or in the right optical element 1222 that overlays the view of the real world seen by the user. Similarly, light 1314 emitted by the projector 1312 encounters the diffractive structures of the waveguide of the near eye display 1316, which directs the light 1314 towards the left eye of a user to provide an image on or in the left optical element 1216 that overlays the view of the real world seen by the user. The combination of a GPU, the forward optical assembly 1302, the forward optical assembly 1310, the left optical element 1216, and the right optical element 1222 may provide an optical engine of the glasses 1200. The glasses 1200 use the optical engine to generate an overlay of the real-world view of the user including display of a 3D user interface to the user of the glasses 1200.

It will be appreciated however that other display technologies or configurations may be utilized within an optical engine to display an image to a user in the user's field of view. For example, instead of a projector 1304 and a waveguide, an LCD, LED or other display panel or surface may be provided.

In use, a user of the glasses 1200 will be presented with information, content and various 3D user interfaces on the near eye displays. As described in more detail elsewhere herein, the user can then interact with a device such as the glasses 1200 using a touchpad 1224 and/or the buttons 1226, voice inputs or touch inputs on an associated device (e.g., the user device 1138 shown in FIG. 11), and/or hand movements, locations, and positions detected by the glasses 1200.

Figure 14:
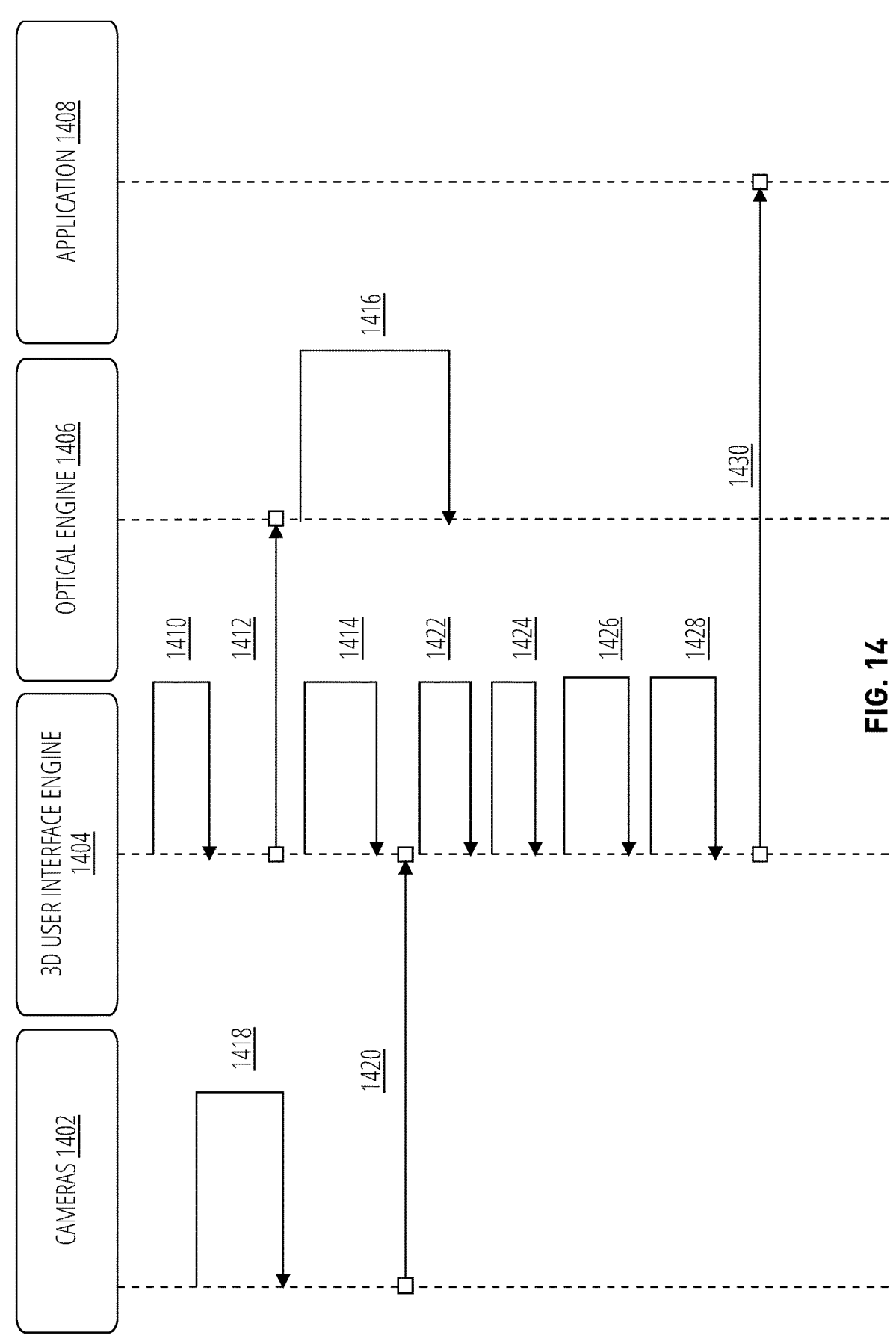
FIG. 14 is a sequence diagram illustrating a three-dimensional (3D) user interface generation and utilization process, according to some examples.
Figure 15:
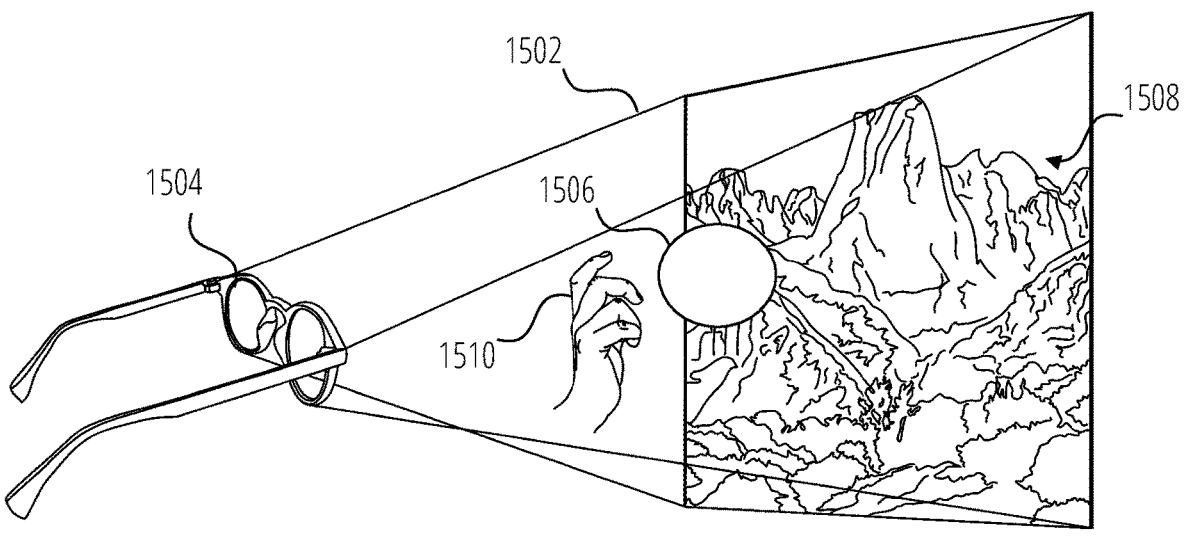
FIG. 15 illustrates a 3D user interface, according to some examples.

Referring now to FIG. 14 and FIG. 15, FIG. 14 depicts a sequence diagram of an example 3D user interface process and FIG. 15 depicts a 3D user interface 1502 of glasses 1504 in accordance with some examples. During the process, a 3D user interface engine 1404 generates 1410 the 3D user interface 1502 including one or more virtual objects 1506 that constitute interactive elements of the 3D user interface 1502. A virtual object may be described as a solid in a 3D geometry having values in 3-tuples of X (horizontal), Y (vertical), and Z (depth). A 3D render of the 3D user interface 1502 is generated and 3D render data 1412 is communicated to an optical engine 1406 of the glasses 1504 and displayed 1416 to a user of the glasses 1504.

The 3D user interface engine 1404 generates 1414 one or more virtual object colliders for the one or more virtual objects. One or more cameras 1402 of the glasses 1504 generate 1418 real world video frame data 1420 of the real world 1508 as viewed by the user of the glasses 1504. Included in the real world video frame data 1420 is hand position video frame data of one or more of the user's hands 1510 from a viewpoint of the user while wearing the glasses 1504 and viewing the projection of the 3D render of the 3D user interface 1502 by the optical engine 1406. Thus the real world video frame data 1420 include hand location video frame data and hand position video frame data of the user's hands 1510 as the user makes movements with their hands 1510. The 3D user interface engine 1404 utilizes the hand location video frame data and hand position video frame data in the real world video frame data 1420 to extract landmarks 1422 of the user's hands from the real world video frame data 1420 and generates 1424 landmark colliders for one or more landmarks on one or more of the user's hands. The landmark colliders are used to determine user interactions between the user and the virtual object by detecting collisions 1426 between the landmark colliders and respective visual object colliders of the virtual objects. The collisions are used by the 3D user interface engine 1404 to determine user interactions 1428 by the user with the virtual objects. The 3D user interface engine 1404 communicates user interaction data 1430 of the user interactions to an application 1408 for utilization by the application 1408.

In some examples, the application 1408 performs the functions of the 3D user interface engine 1404 by utilizing various APIs and system libraries to receive and process the real world video frame data 1420 and instruct the optical engine 1406.

In some examples, a user wears one or more sensor gloves on the user's hands that generate sensed hand position data and sensed hand location data that is used to generate the landmark colliders. The sensed hand position data and sensed hand location data are communicated to the 3D user interface engine 1404 and used by the 3D user interface engine 1404 in lieu of or in combination with the hand location video frame data and hand position video frame data to generate landmark colliders for one or more landmarks on one or more of the user's hands.

Figure 16:
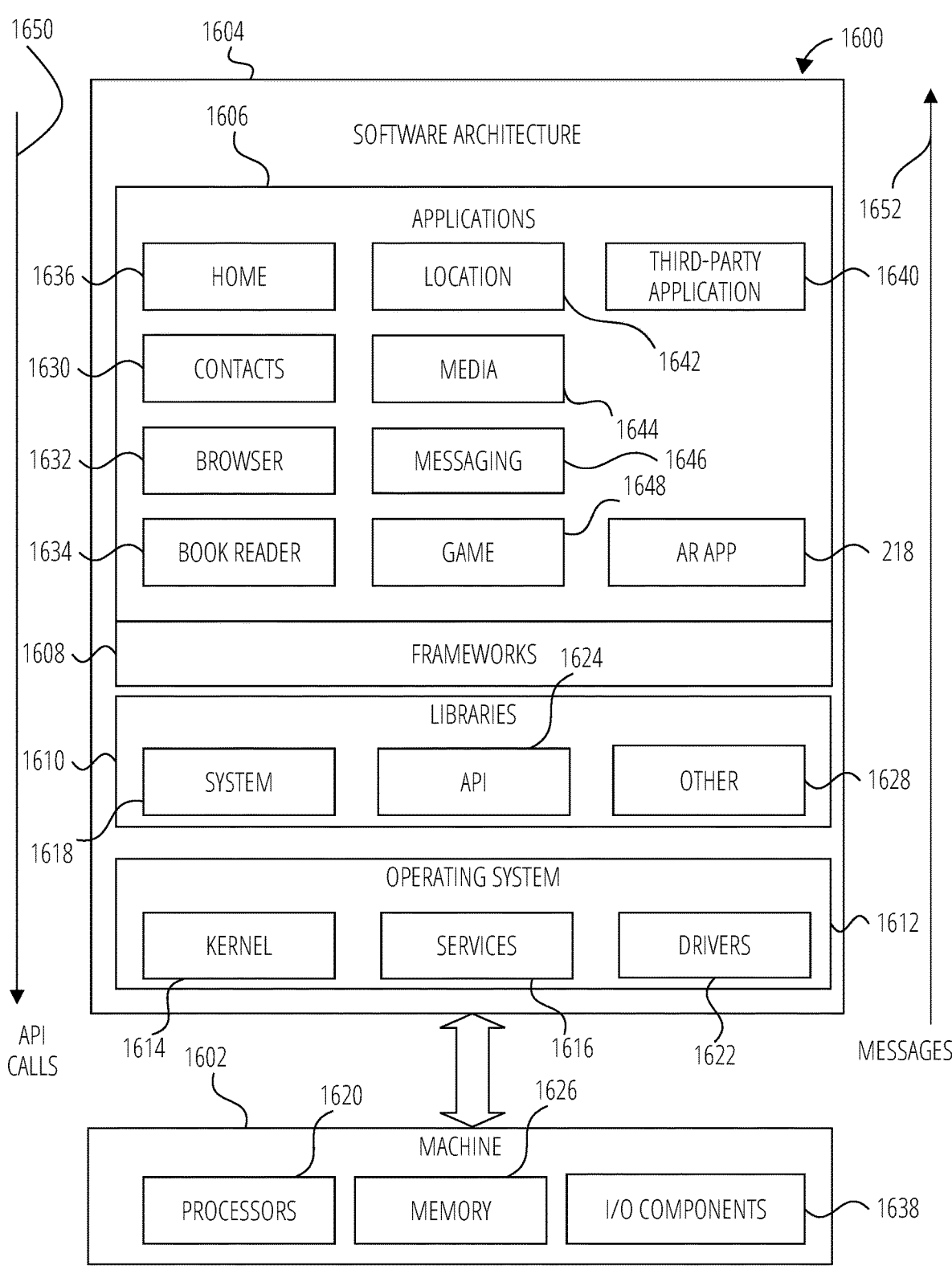
FIG. 16 is a block diagram showing a software architecture within which the present disclosure may be implemented, according to some examples.

FIG. 16 is a block diagram 1600 illustrating a software architecture 1604, which can be installed on any one or more of the devices described herein. The software architecture 1604 is supported by hardware such as a machine 1602 that includes processors 1620, memory 1626, and input/output or I/O components 1638. In this example, the software architecture 1604 can be conceptualized as a stack of layers, where each layer provides a particular functionality. The software architecture 1604 includes layers such as an operating system 1612, libraries 1610, frameworks 1608, and applications 1606. Operationally, the applications 1606 invoke API calls 1650 through the software stack and receive messages 1652 in response to the API calls 1650.

The operating system 1612 manages hardware resources and provides common services. The operating system 1612 includes, for example, a kernel 1614, services 1616, and drivers 1622. The kernel 1614 acts as an abstraction layer between the hardware and the other software layers. For example, the kernel 1614 provides memory management, processor management (e.g., scheduling), component management, networking, and security settings, among other functionality. The services 1616 can provide other common services for the other software layers. The drivers 1622 are responsible for controlling or interfacing with the underlying hardware. For instance, the drivers 1622 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1610 provide a low-level common infrastructure used by the applications 1606. The libraries 1610 can include system libraries 1618 (e.g., C standard library) that provide functions such as memory allocation functions, string manipulation functions, mathematic functions, and the like. In addition, the libraries 1610 can include API libraries 1624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1610 can also include a wide variety of other libraries 1628 to provide many other APIs to the applications 1606.

The frameworks 1608 provide a high-level common infrastructure that is used by the applications 1606. For example, the frameworks 1608 provide various graphical user interface (GUI) functions, high-level resource management, and high-level location services. The frameworks 1608 can provide a broad spectrum of other APIs that can be used by the applications 1606, some of which may be specific to a particular operating system or platform.

In some examples, the applications 1606 may include a home application 1636, a contacts application 1630, a browser application 1632, a book reader application 1634, a location application 1642, a media application 1644, a messaging application 1646, a game application 1648, and a broad assortment of other applications such as a third-party application 1640. The applications 1606 are programs that execute functions defined in the programs. Various programming languages can be employed to create one or more of the applications 1606, structured in a variety of manners, such as object-oriented programming languages (e.g., Objective-C, Java, or C++) or procedural programming languages (e.g., C or assembly language). In some examples, the third-party application 1640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 16, the third-party application 1640 can invoke the API calls 1650 provided by the operating system 1612 to facilitate functionality described herein. The applications 1606 may include an AR application such as the AR application 218 described herein, according to some examples.

Figure 17:
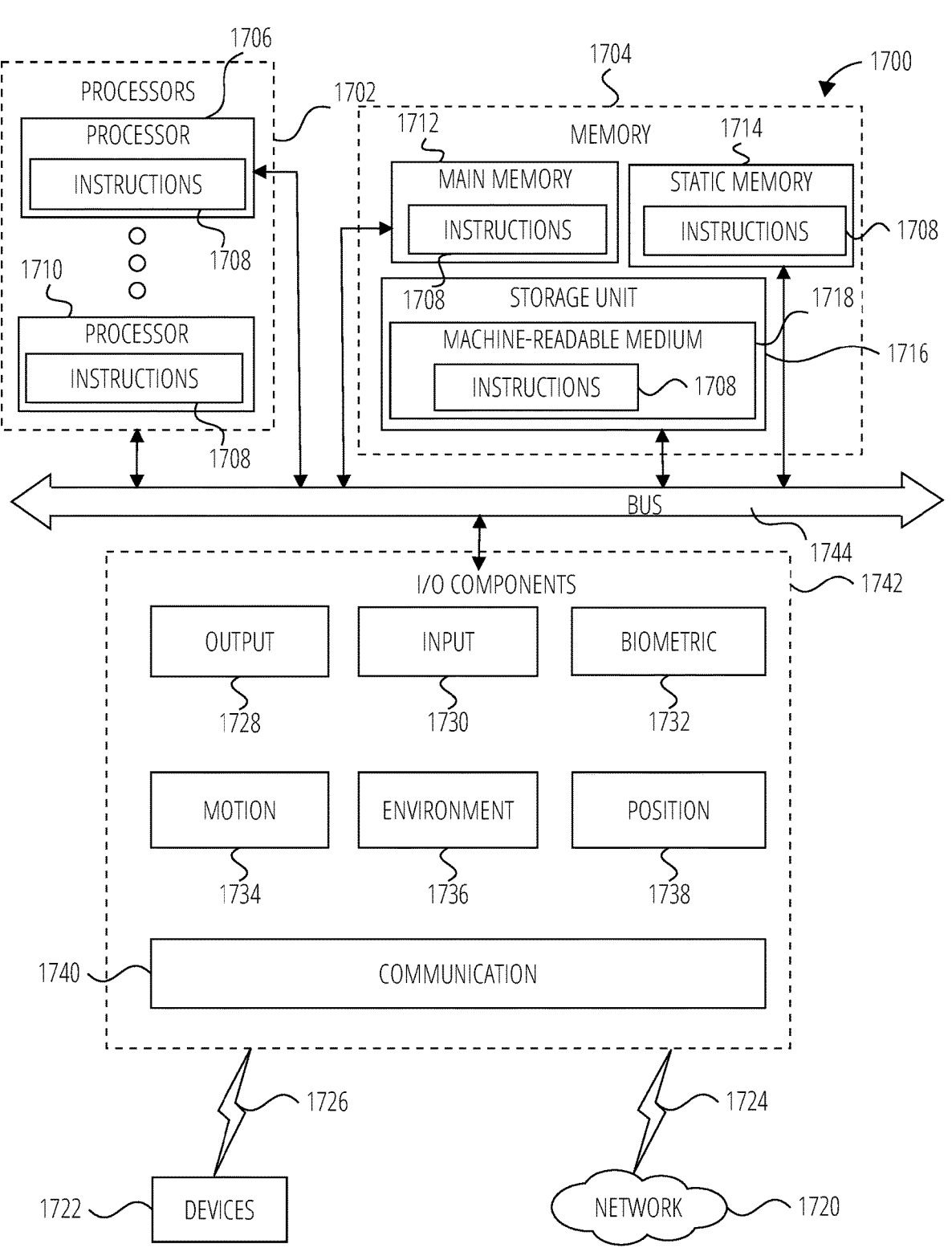
FIG. 17 is a diagrammatic representation of a machine in the form of a computer system within which a set of instructions may be executed for causing the machine to perform any one or more of the methodologies discussed herein, according to some examples.

FIG. 17 is a diagrammatic representation of a machine 1700 within which instructions 1708 (e.g., software, a program, an application, an applet, an app, or other executable code) for causing the machine 1700 to perform any one or more of the methodologies discussed herein may be executed. For example, the instructions 1708 may cause the machine 1700 to execute any one or more of the methods described herein. The instructions 1708 transform the general, non-programmed machine 1700 into a particular machine 1700 programmed to carry out the described and illustrated functions in the manner described. The machine 1700 may operate as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, VR device, a smart home device (e.g., a smart appliance), other smart devices, a web appliance, a network router, a network switch, a network bridge, or any machine capable of executing the instructions 1708, sequentially or otherwise, that specify actions to be taken by the machine 1700. Further, while only a single machine 1700 is illustrated, the term "machine" shall also be taken to include a collection of machines that individually or jointly execute the instructions 1708 to perform any one or more of the methodologies discussed herein.

The machine 1700 may include processors 1702, memory 1704, and I/O components 1742, which may be configured to communicate with each other via a bus 1744. In some examples, the processors 1702 (e.g., a Central Processing Unit (CPU), a Reduced Instruction Set Computing (RISC) processor, a Complex Instruction Set Computing (CISC) Processor, a Graphics Processing Unit (GPU), a Digital Signal Processor (DSP), an ASIC, a Radio-Frequency Integrated Circuit (RFIC), another processor, or any suitable combination thereof) may include, for example, a processor 1706 and a processor 1710 that execute the instructions 1708. The term "processor" is intended to include multi-core processors that may comprise two or more independent processors (sometimes referred to as "cores") that may execute instructions contemporaneously. Although FIG. 17 shows multiple processors 1702, the machine 1700 may include a single processor with a single core, a single processor with multiple cores (e.g., a multi-core processor), multiple processors with a single core, multiple processors with multiples cores, or any combination thereof.

The memory 1704 includes a main memory 1712, a static memory 1714, and a storage unit 1716, accessible to the processors via the bus 1744. The main memory 1704, the static memory 1714, and storage unit 1716 store the instructions 1708 embodying any one or more of the methodologies or functions described herein. The instructions 1708 may also reside, completely or partially, within the main memory 1712, within the static memory 1714, within machine-readable medium 1718 within the storage unit 1716, within at least one of the processors, or any suitable combination thereof, during execution thereof by the machine 1700.

The I/O components 1742 may include a wide variety of components to receive input, provide output, produce output, transmit information, exchange information, capture measurements, and so on. The specific I/O components 1742 that are included in a particular machine will depend on the type of machine. For example, portable machines such as mobile phones may include a touch input device or other such input mechanisms, while a headless server machine will likely not include such a touch input device. It will be appreciated that the I/O components 1742 may include many other components that are not shown in FIG. 17. In various examples, the I/O components 1742 may include output components 1728 and input components 1730. The output components 1728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1742 may include biometric components 1732, motion components 1734, environmental components 1736, or position components 1738, among a wide array of other components. For example, the biometric components 1732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1734 include acceleration sensor Components (e.g., accelerometer), gravitation sensor components, rotation sensor components (e.g., gyroscope), and so forth. The environmental components 1736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1738 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1742 further include communication components 1740 operable to couple the machine 1700 to a network 1720 or devices 1722 via a coupling 1724 and a coupling 1726, respectively. For example, the communication components 1740 may include a network interface component or another suitable device to interface with the network 1720. In further examples, the communication components 1740 may include wired communication components, wireless communication components, cellular communication components, Near Field Communication (NFC) components, Bluetooth™ components, Wi-Fi™ components, and other communication components to provide communication via other modalities. The devices 1722 may be another machine or any of a wide variety of peripheral devices (e.g., a peripheral device coupled via a USB).

Moreover, the communication components 1740 may detect identifiers or include components operable to detect identifiers. For example, the communication components 1740 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1740, such as location via Internet Protocol (IP) geolocation, location via Wi-Fi® signal triangulation, location via detecting an NFC beacon signal that may indicate a particular location, and so forth.

The various memories (e.g., memory 1704, main memory 1712, static memory 1714, and/or memory of the processors 1702) and/or storage unit 1716 may store one or more sets of instructions and data structures (e.g., software) embodying or used by any one or more of the methodologies or functions described herein. These instructions (e.g., the instructions 1708), when executed by processors 1702, cause various operations to implement the disclosed examples.

The instructions 1708 may be transmitted or received over the network 1720, using a transmission medium, via a network interface device (e.g., a network interface component included in the communication components 1740) and using any one of a number of well-known transfer protocols (e.g., hypertext transfer protocol (HTTP)). Similarly, the instructions 1708 may be transmitted or received using a transmission medium via the coupling 1726 (e.g., a peer-to-peer coupling) to the devices 1722.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

CONCLUSION

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in examples for the purpose of streamlining the disclosure. This method of disclosure is not to be interpreted as reflecting an intention that the examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a method performed by an extended reality (XR) device that implements a multi-camera object tracking system, the method comprising: accessing object tracking data associated with an object in a real-world environment; activating, based on the object tracking data, a low-power mode of the multi-camera object tracking system; and in the low-power mode, determining a state of the object in the real-world environment using the multi-camera object tracking system.

In Example 2, the subject matter of Example 1 includes, wherein the object is a hand of a user of the XR device.

In Example 3, the subject matter of Example 2 includes, wherein the object tracking data comprises handedness data that identifies the hand of the user.

In Example 4, the subject matter of any of Examples 1-3 includes, wherein activating the low-power mode comprises dynamically selecting a subset of cameras of the multi-camera object tracking system for determining the state of the object.

In Example 5, the subject matter of any of Examples 1-4 includes, wherein determining the state of the object comprises activating a dynamic switching function that causes the XR device to switch between different subsets of cameras of the multi-camera object tracking system to determine the state of the object, such that, at a first point in time, a first subset of the cameras is selected to determine the state of the object, and at a second point in time, a second subset of the cameras is selected to determine the state of the object.

In Example 6, the subject matter of Example 5 includes, wherein the dynamic switching function causes the XR device to cycle through the different subsets of cameras of the multi-camera object tracking system in a sequence that is based on the object tracking data.

In Example 7, the subject matter of any of Examples 1-6 includes, wherein the state of the object comprises at least a location associated with the object, and wherein the object tracking data comprises a predicted location of the object within a three-dimensional reference coordinate system of the XR device.

In Example 8, the subject matter of Example 7 includes, wherein the predicted location of the object is generated based on at least one of: historic tracking data; or a predicted pose of the XR device.

In Example 9, the subject matter of any of Examples 7-8 includes, wherein activating the low-power mode comprises selecting, based on the predicted location of the object relative to a field of view of each respective camera of the multi-camera object tracking system, a subset of cameras of the multi-camera object tracking system for determining the state of the object in the real-world environment.

In Example 10, the subject matter of any of Examples 7-9 includes, wherein determining the state of the object comprises: projecting, for each camera of the multi-camera object tracking system and based on a predetermined calibration of the camera, the predicted location of the object onto a two-dimensional camera view image to obtain a two-dimensional projected location; selecting, based on the projected locations, a subset of cameras of the multi-camera object tracking system; and using only the subset of cameras to determine the state of the object in the real-world environment.

In Example 11, the subject matter of Example 10 includes, wherein each camera in the subset of cameras is selected based on the projected location relative to at least one reference location within the respective camera view image.

In Example 12, the subject matter of Example 11 includes, wherein, for each camera in the subset of cameras, the camera is selected based on the projected location meeting a predefined condition, wherein the predefined condition is one of: a distance between the projected location and the at least one reference location is less than a threshold value; a difference between the distance between the projected location and the at least one reference location for one or more other cameras of the multi-camera object tracking system and the distance between the projected location and the at least one reference location for the camera exceeds a threshold value; the projected location is within a predetermined zone in the respective camera view image relative to the at least one reference location; or the projected location is outside of a predetermined zone in the respective camera view image relative to the at least one reference location.

In Example 13, the subject matter of Example 12 includes, wherein the camera is selected based on the predefined condition being met with respect to multiple consecutive frames.

In Example 14, the subject matter of any of Examples 11-13 includes, wherein projecting the predicted location of the object comprises projecting at least one point of interest associated with the object onto the camera view image and determining a bounding box associated with the at least one point of interest, the method further comprising, for each camera of the multi-camera object tracking system, determining a distance between the bounding box and the at least one reference location within the respective camera view image, each camera in the subset of cameras being selected based on the determined distance.

In Example 15, the subject matter of any of Examples 1-14 includes, wherein activating the low-power mode comprises reducing a sampling rate of at least a subset of cameras of the multi-camera object tracking system.

In Example 16, the subject matter of any of Examples 1-15 includes, wherein activating the low-power mode comprises activating a reduced image processing setting for at least a subset of cameras of the multi-camera object tracking system.

In Example 17, the subject matter of any of Examples 1-16 includes, wherein activating the low-power mode comprises: selecting, based on the object tracking data, a subset of cameras of the multi-camera object tracking system for determining the state of the object; and switching off each camera of the multi-camera object tracking system that is excluded from the selected subset of cameras.

In Example 18, the subject matter of any of Examples 1-17 includes, wherein the object tracking data comprises at least one of: detection data indicating whether the object has been detected; a predicted location of the object within a three-dimensional reference coordinate system of the XR device; a predicted appearance zone of the object; predicted motion of the object; handedness data of a user of the XR device; historic power consumption data for at least one camera of the multi-camera object tracking system; or expected inference performance for at least one camera of the multi-camera object tracking system with respect to the object.

Example 19 is an extended reality (XR) device comprising: a multi-camera object tracking system; a memory that stores instructions; and at least one processor configured by the instructions to perform operations comprising: accessing object tracking data associated with an object in a real-world environment; activating, based on the object tracking data, a low-power mode of the multi-camera object tracking system; and in the low-power mode, determining a state of the object in the real-world environment using the multi-camera object tracking system.

Example 20 is a non-transitory computer-readable storage medium, the computer-readable storage medium including instructions that when executed by at least one processor of an extended reality (XR) device that implements a multi-camera object tracking system, cause the at least one processor to perform operations comprising: accessing object tracking data associated with an object in a real-world environment; activating, based on the object tracking data, a low-power mode of the multi-camera object tracking system; and in the low-power mode, determining a state of the object in the real-world environment using the multi-camera object tracking system.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A method performed by an extended reality (XR) device that implements a multi-camera object tracking system, the method comprising:

accessing object tracking data associated with an object in a real-world environment;

activating, based on the object tracking data, a low-power mode of the multi-camera object tracking system;

in the low-power mode, activating a dynamic switching function that causes the XR device to switch between different subsets of cameras of the multi-camera object tracking system;

cycling through the different subsets of cameras of the multi-camera object tracking system according to a sampling sequence that is selected based on the object tracking data, the sampling sequence sampling more frequently from one or more cameras than from one or more other cameras of the multi-camera object tracking system; and determining a state of the object in the real-world environment using the multi-camera object tracking system.

2. The method of claim 1, wherein the object is a hand of a user of the XR device.

3. The method of claim 2, wherein the object tracking data comprises handedness data that identifies the hand of the user.

4. The method of claim 1, wherein activating the low-power mode comprises dynamically selecting a subset of cameras of the multi-camera object tracking system for determining the state of the object.

5. The method of claim 1, wherein activating the dynamic switching function causes, at a first point in time, a first subset of the cameras to be selected to determine the state of the object, and at a second point in time, a second subset of the cameras to be selected to determine the state of the object.

6. The method of claim 1, wherein the state of the object comprises at least a location associated with the object, and wherein the object tracking data comprises a predicted location of the object within a three-dimensional reference coordinate system of the XR device.

7. The method of claim 6, wherein the predicted location of the object is generated based on at least one of: historic tracking data; or a predicted pose of the XR device.

8. The method of claim 6, wherein activating the low-power mode comprises selecting, based on the predicted location of the object relative to a field of view of each respective camera of the multi-camera object tracking system, a subset of cameras of the multi-camera object tracking system for determining the state of the object in the real-world environment.

9. The method of claim 6, wherein determining the state of the object comprises:

projecting, for each camera of the multi-camera object tracking system and based on a predetermined calibration of the camera, the predicted location of the object onto a two-dimensional camera view image to obtain a two-dimensional projected location;

selecting, based on the projected locations, a subset of cameras of the multi-camera object tracking system; and using only the subset of cameras to determine the state of the object in the real-world environment.

10. The method of claim 9, wherein each camera in the subset of cameras is selected based on the projected location relative to at least one reference location within the respective camera view image.

11. The method of claim 10, wherein, for each camera in the subset of cameras, the camera is selected based on the projected location meeting a predefined condition, wherein the predefined condition is one of: a distance between the projected location and the at least one reference location is less than a threshold value;

a difference between the distance between the projected location and the at least one reference location for one or more other cameras of the multi-camera object tracking system and the distance between the projected location and the at least one reference location for the camera exceeds a threshold value;

the projected location is within a predetermined zone in the respective camera view image relative to the at least one reference location; or the projected location is outside of a predetermined zone in the respective camera view image relative to the at least one reference location.

12. The method of claim 11, wherein the camera is selected based on the predefined condition being met with respect to multiple consecutive frames.

13. The method of claim 10, wherein projecting the predicted location of the object comprises projecting at least one point of interest associated with the object onto the camera view image and determining a bounding box associated with the at least one point of interest, the method further comprising, for each camera of the multi-camera object tracking system, determining a distance between the bounding box and the at least one reference location within the respective camera view image, each camera in the subset of cameras being selected based on the determined distance.

14. The method of claim 1, wherein activating the low-power mode comprises reducing a sampling rate of at least a subset of cameras of the multi-camera object tracking system.

15. The method of claim 1, wherein activating the low-power mode comprises activating a reduced image processing setting for at least a subset of cameras of the multi-camera object tracking system.

16. The method of claim 1, wherein activating the low-power mode comprises:

selecting, based on the object tracking data, a subset of cameras of the multi-camera object tracking system for determining the state of the object; and switching off each camera of the multi-camera object tracking system that is excluded from the selected subset of cameras.

17. The method of claim 1, wherein the object tracking data comprises at least one of:

detection data indicating whether the object has been detected;

a predicted location of the object within a three-dimensional reference coordinate system of the XR device;

a predicted appearance zone of the object;

predicted motion of the object;

handedness data of a user of the XR device;

historic power consumption data for at least one camera of the multi-camera object tracking system; or expected inference performance for at least one camera of the multi-camera object tracking system with respect to the object.

18. The method of claim 1, wherein cycling through the different subsets of cameras of the multi-camera object tracking system causes a reduction in power consumption associated with the one or more other cameras.

19. An extended reality (XR) device comprising:

a multi-camera object tracking system;

a memory that stores instructions; and at least one processor configured by the instructions to perform operations comprising:

accessing object tracking data associated with an object in a real-world environment;

activating, based on the object tracking data, a low-power mode of the multi-camera object tracking system;

in the low-power mode, activating a dynamic switching function that causes the XR device to switch between different subsets of cameras of the multi-camera object tracking system;

cycling through the different subsets of cameras of the multi-camera object tracking system according to a sampling sequence that is selected based on the object tracking data, the sampling sequence sampling more frequently from one or more cameras than from one or more other cameras of the multi-camera object tracking system; and determining a state of the object in the real-world environment using the multi-camera object tracking system.

20. A non-transitory computer-readable storage medium, the computer-readable storage medium including instructions that when executed by at least one processor of an extended reality (XR) device that implements a multi-camera object tracking system, cause the at least one processor to perform operations comprising:

accessing object tracking data associated with an object in a real-world environment;

activating, based on the object tracking data, a low-power mode of the multi-camera object tracking system;

in the low-power mode, activating a dynamic switching function that causes the XR device to switch between different subsets of cameras of the multi-camera object tracking system;

cycling through the different subsets of cameras of the multi-camera object tracking system according to a sampling sequence that is selected based on the object tracking data, the sampling sequence sampling more frequently from one or more cameras than from one or more other cameras of the multi-camera object tracking system; and determining a state of the object in the real-world environment using the multi-camera object tracking system.

* * * * *